US012664124B2

(12) United States Patent
Komatsu et al.

(10) Patent No.: US 12,664,124 B2
(45) Date of Patent: Jun. 23, 2026

(54) MANAGING VOLUME SNAPSHOTS IN THE CLOUD

(71) Applicant: NetApp, Inc., San Jose, CA (US)

(72) Inventors: Kiyoshi Komatsu, Sunnyvale, CA (US); Ardalan Kangarlou, Raleigh, NC (US); Richard Swift, Pittsburgh, PA (US); Rajesh Rajaraman, Waltham, MA (US); Ling Zheng, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/432,243

(22) Filed: Feb. 5, 2024

(65) Prior Publication Data

US 2025/0004986 A1    Jan. 2, 2025

Related U.S. Application Data

(63) Continuation of application No. 17/039,931, filed on Sep. 30, 2020, now Pat. No. 11,921,671.

(Continued)

(51) Int. Cl.
*G06F 16/11*          (2019.01)
*G06F 11/1446*        (2026.01)
(Continued)

(52) U.S. Cl.
CPC ........ *G06F 16/128* (2019.01); *G06F 11/1469* (2013.01); *G06F 12/0253* (2013.01); *G06F 16/162* (2019.01); *G06F 16/1827* (2019.01)

(58) Field of Classification Search
CPC ............... G06F 16/128; G06F 11/1469; G06F 12/0253; G06F 16/162; G06F 16/1827;
(Continued)

(56) References Cited

U.S. PATENT DOCUMENTS 11,086,545 B1     8/2021   Dayal
11,809,735 B1 *  11/2023   Kumar .................... G06F 11/07
(Continued)

OTHER PUBLICATIONS

Non-Final Office Action mailed on Apr. 26, 2023 for U.S. Appl. No. 17/039,931, filed Sep. 30, 2020, 17 pages.
(Continued)

*Primary Examiner* — Ajay M Bhatia
*Assistant Examiner* — Cindy Nguyen
(74) *Attorney, Agent, or Firm* — Jaffery Watson Hamilton & DeSanctis LLP

(57) ABSTRACT

Systems, methods, and machine-readable media for creating, deleting, and restoring volume snapshots in a remote data store are disclosed. A storage volume and a storage operating system are implemented in a software container. Through a user interface, a user may create a snapshot of the volume to a cloud storage. A user may also delete individual snapshots from the cloud storage. Further, deletion of a most recent snapshot may occur by awaiting deletion (though marking as deleted to the user) until a next snapshot is received. Snapshots in the cloud storage are manipulatable even after destruction of the source volume (by destruction of the container, for example). A controller outside the container is used by implementing the same API as the controller in the container had. Full restores of snapshots in the cloud are also possible even when the original container and volume have been destroyed.

20 Claims, 12 Drawing Sheets

Related U.S. Application Data

(60) Provisional application No. 63/044,743, filed on Jun. 26, 2020.

(51) Int. Cl.
*G06F 12/02* (2006.01)
*G06F 16/16* (2019.01)
*G06F 16/182* (2019.01)

(58) Field of Classification Search
CPC .... G06F 2201/84; G06F 16/16; G06F 16/182; G06F 16/11
See application file for complete search history.

(56) References Cited

U.S. PATENT DOCUMENTS

| | | | |
|---|---|---|---|
| 11,921,671 B2 | 3/2024 | Komatsu et al. | |
| 2016/0124669 A1 | 5/2016 | Harris | |
| 2020/0019620 A1 | 1/2020 | Sarda | |
| 2020/0026687 A1* | 1/2020 | Ben Dayan ........... | G06F 16/134 |
| 2020/0133920 A1 | 4/2020 | Wang | |
| 2021/0103499 A1* | 4/2021 | Alluboyina ............. | G06F 3/067 |
| 2021/0286535 A1* | 9/2021 | Aldred ................ | G06F 11/3442 |
| 2021/0286760 A1 | 9/2021 | Aldred | |

OTHER PUBLICATIONS

Notice of Allowance mailed on Nov. 1, 2023 for U.S. Appl. No. 17/039,931, filed Sep. 30, 2020, 8 pages.

* cited by examiner

600

MANAGING VOLUME SNAPSHOTS IN THE CLOUD

CROSS REFERENCE TO RELATED APPLICATIONS

The present application is a continuation of U.S. patent application Ser. No. 17/039,931 filed Sep. 30, 2020, which claims priority to and the benefit of U.S. Provisional Patent Application No. 63/044,743, filed on Jun. 26, 2020, both of which are incorporated herein by reference in their entireties as if fully set forth below and for all applicable purposes.

TECHNICAL FIELD

The present description relates to data protection and mobility. More specifically, the present description relates to managing snapshots of containerized storage systems that are stored remotely in the cloud.

BACKGROUND

In some storage systems, storage controllers may create, store, and manage volume snapshots on remote storage or even in the cloud. Remotely storing snapshots provides data security and mobility allowing a user to access and restore data from the remotely stored backup. However, there are challenges in providing all the features and capabilities that users expect.

Storing snapshots remotely presents challenges for the software managing the snapshots. Those challenges are difficult for full size systems that are always present. The challenges related to successfully managing remote data snapshots are compounded by the introduction of providing storage systems as a service, such as within a containerized environment. When storage systems are implemented in containers, an instance of the storage system might not even exist when a user wants to retrieve or manage the data snapshots.

For example, current approaches do not allow a user to individually select which snapshot to delete and lacks a mechanism by which to manage different data snapshots after the instance of the storage system is gone (e.g., the container has been deleted).

BRIEF DESCRIPTION OF THE DRAWINGS

The present disclosure is best understood from the following detailed description when read with the accompanying figures.

DETAILED DESCRIPTION

Figure 1:
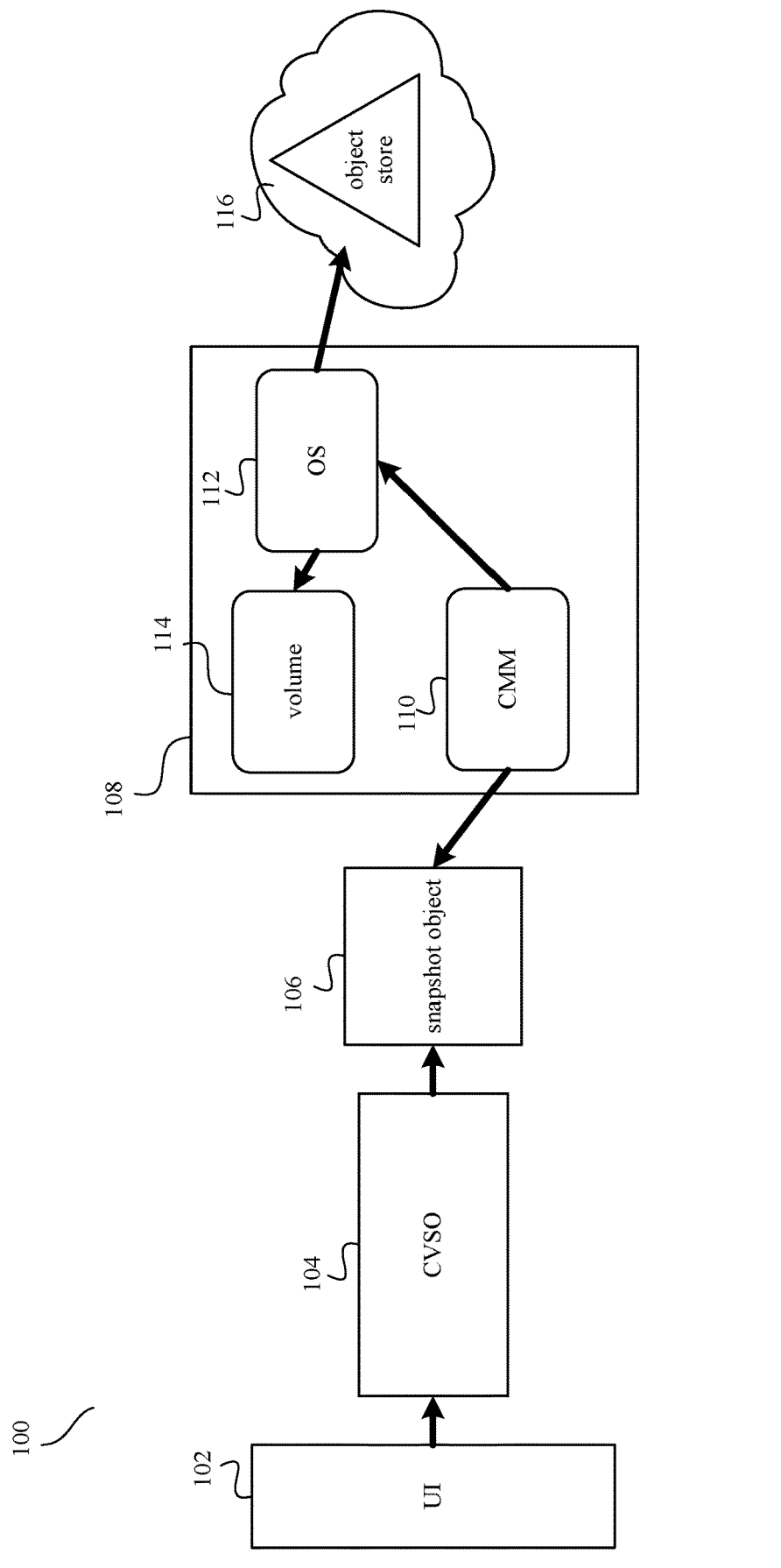
FIG. 1 illustrates a snapshot creation system architecture according to some embodiments of the present description.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for creating, deleting, and restoring volume snapshots in a remote data store. In an embodiment, a storage volume and a storage operating system are implemented in a software container (referred to herein simply as a container). The container may be a self-contained unit of software including all executables and dependencies required for a single task. The container allows for easier distribution and setup of standard software environments, and at scale. Through a user interface, a user may set up a volume within a container as well as manage the volume. According to aspects of the present disclosure, such management may include additional functionality such as choosing to create or delete a snapshot of the data in the volume to a remote object storage system (referred to more generally as a cloud or cloud storage herein). Such snapshots may take the form of a full snapshot or an incremental snapshot as will be discussed further herein.

The creation and deletion of storage volume snapshots typically involve software, and orchestration may be difficult to implement in a container environment due to various constraints such as relating to resource availability, cost, etc. Further, in the container environment the software running within the container may be hidden from the standard orchestration layer. According to embodiments of the present disclosure, an application programming interface (API) (e.g., a single API instead of multiple APIs) may be used in innovative ways to interact with the storage volume and remote object store (also referred to herein generally as the cloud).

For example, previous systems relied on schedule-based snapshot deletion methods and systems to maintain remote snapshots (e.g., cloud snapshots). According to embodiments of the present disclosure, a user is enabled to select individual snapshots to delete. When a deletion command is received, metadata is marked indicating the snapshot is deleted. Garbage collection is triggered from the deletion event to start deleting the snapshot from the remote object store. The storage operating system running within the container is polled by another process in the container during the garbage collection process so that a completed message is not returned until the snapshot is fully deleted by the garbage collection.

As another example, deletion of the most recent snapshot is facilitated even when future snapshots are expected. This process occurs without having to incur the high overhead cost of transferring all of the data necessary from the target volume in the container for a new snapshot in the cloud. When a delete request is received for the latest snapshot, the storage operating system in the container marks the snapshot as pending deletion and returns a success message without deleting the snapshot. Once a new snapshot is stored in the cloud, the marked snapshot is actually deleted from the cloud. In this way, the system can maintain the differences included in the latest snapshot when the new snapshot is created (e.g., an incremental snapshot) without having to create a full snapshot.

As another example, management of snapshots stored in a remote object store is enabled even after the container housing the original volume has been destroyed and the volume deleted. To facilitate this, a secondary controller is implemented outside the container environment in which the volume exists to monitor requests relating to the snapshots in the remote object store. If the container with the volume has been destroyed, and thus the volume, the secondary controller is able to request deletion of the selected snapshot in place of the storage operating system within the container (which no longer exists). The secondary controller implements the same API as the storage operating system within the container included with which to delete snapshots in the cloud. This provides for a consistent method of orchestration.

As another example, the full restore of a remote snapshot is possible even when the original container and volume have been destroyed. According to embodiments of the present disclosure, a user selects the snapshot to restore via a user interface. From this identification, the system creates a new container with an instance of the storage operating system. The storage operating system in the container issues a command to access the cloud (e.g., a cloud bucket) where the snapshots of the volume are stored (e.g., snapshots of the volume). The storage operating system uses an API to start an on-demand restoration of the volume from the snapshot. The storage operating system then creates a volume to populate with the snapshot data within the container. As part of this restoration process, the volume metadata from the snapshot may be accessed first-once the metadata is copied, the volume is on-demand available to requesting clients (though access may be slower, as a background scanner actively pulls the data from the cloud). As more blocks from the snapshot are pulled from the cloud, and become resident in the volume in the container, performance improves until all of the cloud snapshot data is present in the volume. At this point, the cloud snapshot is unlocked and able to be deleted if desired.

As a result, embodiments of this system enable storage operating systems that work within containers (e.g., with reduced functionality due to limitations of the container environment) to send snapshots to the cloud. As a result, greater data resiliency and protection is provided, regardless of whether the underlying volume still exists or not. In other words, snapshots can be copied to the cloud, and are independent from the volume from which they originate. Thus, these snapshots may protect the data in a volume and survive even after the volume is deleted (e.g., as a result of the container in which the volume is instantiated being destroyed). Such snapshots may be implemented for a single region standard object storage, and/or multi-region storage. Moreover, individual snapshots in the cloud may be selected to be deleted or otherwise manipulated. These snapshots in the cloud, which may survive their source volumes' deletion, can subsequently be used to repurpose the data from the original volume to any number of new volumes. Moreover, these snapshots may be restored both within and across regions, and fast access to the volume (even before the data is fully reconstituted) facilitated via on-demand restoration.

FIG. 1 illustrates a snapshot creation system architecture 100 according to embodiments of the present disclosure. According to embodiments of the present disclosure, a snapshot refers to an external point in time copy of a source volume, replicated to a cloud (e.g., a cloud bucket), and is thus referred to herein also as a cloud snapshot. Management of the lifecycle of a cloud snapshot may be directed by a user. The architecture 100 may be implemented over a single node of a distributed computing system, or a cluster of nodes. Each node may be, for example, a different physical server, while in other embodiments different nodes may be run on the same physical server. In some examples, the architecture 100 may be orchestrated using Kubernetes, which is an open-source system for managing containerized applications. More particularly, Kubernetes aids in the management of containerized applications across a group of machines (e.g., virtual machines).

The snapshot creation architecture 100 includes a user interface 102 in communication with a cloud volume service orchestrator (CVSO) 104. In some examples, a requesting node may host the user interface 102 (e.g., a graphical user interface). In other examples the user interface 102 may be hosted by another computing node. In one or more examples, an end user may provide a user input to the snapshot creation architecture 100 either directly or indirectly via the user interface 102. The nodes within the architecture 100 may be in communication with each other via any number of wired communications links, wireless communications links, optical communications links, or combination thereof.

The CVSO 104 may be used to create and/or update snapshots based on input from user interface 102. The CVSO 104 may do so by creating, in response to a request, a snapshot object 106. For example, the snapshot object 106 may be a custom resource (i.e., an endpoint) in a Kubernetes API that stores a collection of API objects. The CVSO 104 may send the snapshot object 106 to a container 108. The container 108 may include a container monitoring module (CMM) 110, a storage operating system (OS) 112, and a volume 114. The CMM 110 may function to detect the creation and/or update of the snapshot objects 106 and communicate those changes to the storage OS 112. The storage OS 112 has access to a volume 114 from which a snapshot is created or updated.

The storage OS 112 may also have access to an object store 116. The object store 116 stores the snapshots of volume 114. An example of an object store 116 may be a cloud bucket or other type of cloud-based object store. The first time a snapshot of volume 114 is created, storage OS 112 may perform a baseline transfer to the object store 116. It may be appreciated that any type of data (e.g., a file, a directory, an image, a storage virtual machine, a logical unit number (LUN), application data, backup data, metadata, database data, a virtual machine disk, etc.) residing in the volume 114 in the container 108, using any type of file system, can be stored into objects for storage within the object store 116. This allows the data to be represented as a file system so that the data of the objects can be accessed and mounted on-demand by remote computing devices. This also provides a high degree of flexibility in being able to access data from the object store 116 for analytics or data access on an on-demand basis. The object file system is able to represent snapshots in the object store, and provides the ability to access snapshot data universally for whomever has access to an object format of the object file system.

A baseline transfer of the volume 114 copies all of the data on volume 114 as the snapshot stored in the object store 116. A subsequent snapshot request for the volume 114 may use an incremental transfer. In an incremental transfer, storage OS 112 sends the difference between the latest snapshot in the object store 116 and the current state of volume 114 (e.g., as opposed to a full point-in-time copy of the volume 114 again).

The user interface 102 provides a user the ability to see available volumes (e.g. volume 114) and initiate snapshot creation of a selected volume. In an embodiment, the user interface 102 is a graphical user interface (GUI). In an embodiment, the user interface is a command line interface (CLI). In an embodiment, the user interface 102 is an application programming interface (API). In another embodiment, the user interface 102 is a simple network management protocol (SNMP) interface. In addition to providing the user the ability to select a volume for snapshot, the user interface 102 may provide the user the ability to delete a selected snapshot, abort a currently processing snapshot, and restore a selected snapshot, each of which is discussed in further detail below. The user interface 102 communicates the volume selection and action, in the example of FIG. 1, to create a snapshot to the CVSO 104.

In an embodiment, the CVSO 104 may receive instructions from the user interface 102. The CVSO 104 may run on a server that may be remote to the client computer running the user interface 102. The CVSO 104 may create the snapshot object 106 in response to receipt of the instruction from the user interface 102 (in the example of FIG. 1 to create the snapshot). The CVSO 104 may provide an identifier, such as a snapshot universally unique identifier (UUID), for inclusion in the snapshot object 106. With respect to the operation of the architecture 100 of FIG. 1, the CVSO 104 acts as an intermediary between the user interface 102 and the container 108. The CVSO 104 may create a snapshot object 106 for each snapshot stored in the object store 116.

The snapshot object 106 (e.g., a cloud snapshot custom resource (CR) such as in Kubernetes) includes data provided by the CVSO 104, as well as the CMM 110. The snapshot object 106 may include a snapshot identifier unique to each snapshot, object store 116 identifier (e.g., an object store UUID), logical space required to restore a snapshot, creation percent complete, and snapshot create time (and potentially other information). As will be discussed further below, an endpoint UUID (as an example identifier) identifies the object store 116 that stores the snapshot identified by the snapshot UUID. The endpoint UUID may be used to restore a volume from a snapshot (e.g., whether or not the original volume still exists or not in a container). As will be discussed further below, the logical size may provide the size of the volume associated with the snapshot. The logical size may be used as well for restoring a volume from a snapshot. As will be described for various embodiments below, the snapshot object 106 may be used to facilitate communication and status updates between the user interface 102 and the container 108 during snapshot creation, deletion, and restoration. A unique snapshot object 106 may be created for each snapshot.

In an embodiment, the container 108 is a container such as, for example, a Docker container or a CoreOS container. A container may refer to a standardized unit of software that packages executables and dependencies for those executables in a package to allow for quick installation and ensure that the software runs as expected. In an embodiment, the container 108 is a container management tool such as, for example, a Kubernetes Pod, a Mesos Containerizer, or a Docker swarm (to name a few examples). A container management tool may manage one or more containers along with any shared storage or network connections and provides configurations for running the containers. In an embodiment, the container 108 includes a group of applications running natively on a computer system. In the present embodiment, the container 108 may include the CMM 110, the storage OS 112, and the volume 114.

Container management module (CMM) 110 may be a software tool for monitoring containers or clusters of containers, such as, for example, a controller (used with Kubernetes pods) or Prometheus (used with Docker swarm). In an embodiment, the CMM 110 detects the creation of the snapshot object 106 (e.g., an API endpoint such as a snapshot CR). In an embodiment, the CMM 110 is a separate container running within container 108. In an embodiment, CMM 110 is a module running within a container for monitoring the status of snapshot object 106 and communicating with the storage OS 112.

In an embodiment, storage OS 112 may be a storage operating system running within container 108. Storage OS 112 may include an application for mounting volume 114, as well as an application (the same or different) for creating snapshots to store in object store 116. In the present embodiment, the storage OS 112 can create a relationship between volume 114 and the object store 116 where the snapshots will be stored. The storage OS 112 may create the snapshots as requested, either baseline snapshot or incremental snapshot, and communicate the progress and/or failure of the creation back to CMM 110 (e.g., in response to polling from the CMM 110).

Figure 2:
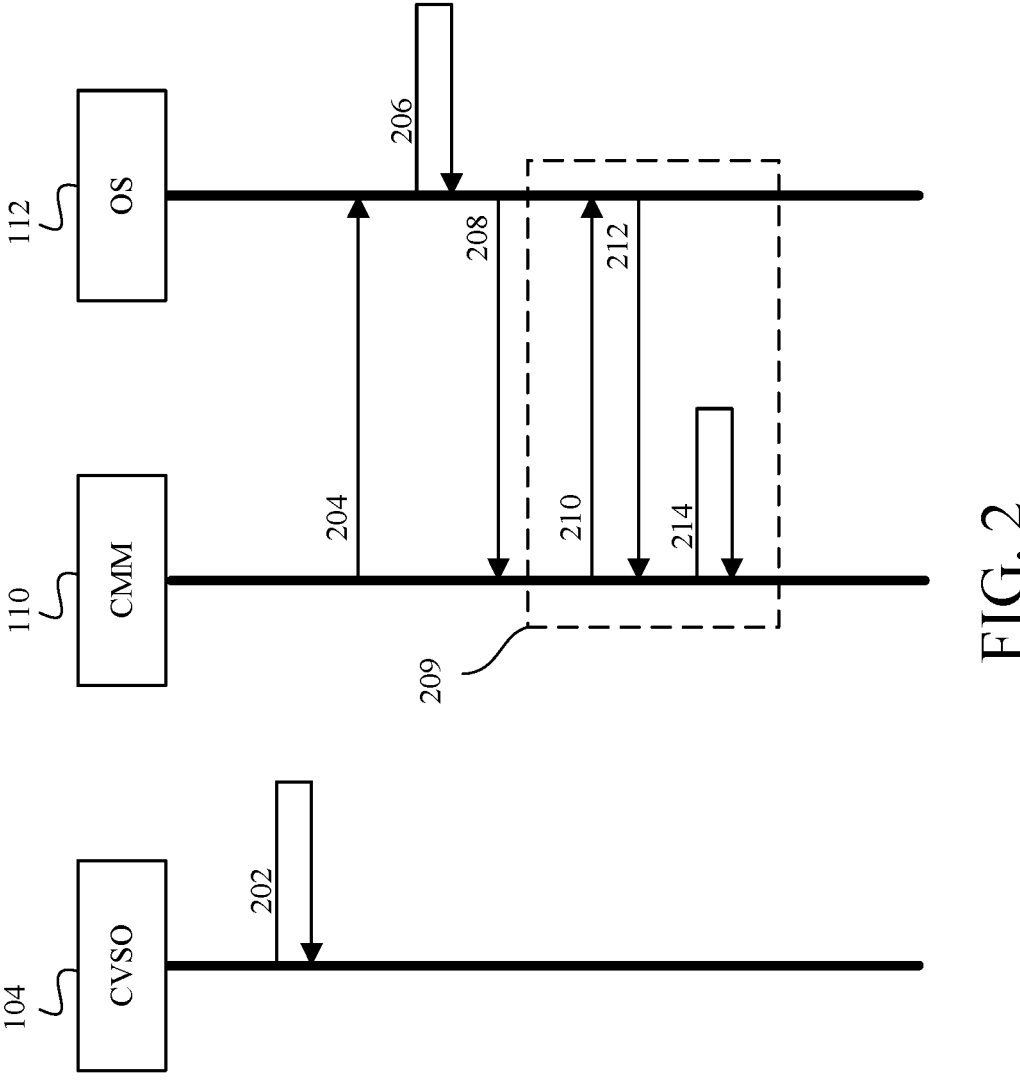
FIG. 2 illustrates a snapshot creation process flow according to some embodiments of the present description.
Figure 2:

Operation of the architecture of FIG. 1 will now be described. Turning to FIG. 2, a snapshot creation process flow 200 is provided. The creation process flow 200 shows communications between the CVSO 104, the CMM 110, and the storage OS 112 as introduced in FIG. 1 above.

At action 202, the CVSO 104 creates a snapshot object 106. At this point, the snapshot object 106 may contain only a snapshot identifier (e.g., snapshot UUID) provided by the CVSO 104. At this stage, other information may not yet be known for inclusion in the snapshot object 106, such as endpoint UUID, percent complete, snapshot create time and logical size. Action 202 may occur in response to a user selection (e.g., via user interface 102) of a volume and creation of a cloud snapshot of that volume (e.g., volume 114).

At action 204, the CMM 110 detects the creation of the snapshot object 106 and sends a message to the storage OS 112 (e.g., a POST message, which is used for purposes of exemplary discussion herein below). The POST payload may include the object store 116 information (e.g., cloud bucket information), including credentials, and the snapshot identifier. In an embodiment, the object store 116 credentials may be used to facilitate writing the snapshots to and/or reading from the object store 116. In another embodiment, the object store 116 may not require credentials for reading and/or writing.

At action 206, the storage OS 112 creates one or more configurations and relationships for snapshot storage and begins the transfer to the object store 116. In an embodiment, configurations for the chosen object store 116 are created. Further, a relationship between the chosen volume (e.g.

volume 114) and the chosen object store (e.g. object store 116) may be created if not present already (e.g., a SnapMirror® relationship according to one example implementation). Further, the created relationship may facilitate a failover scenario for using information from the object store 116 if the volume 114 fails. The created relationship may allow for successful transfer of data from the volume 114 to the object store 116 in the case of transfer disruption. Further, the storage OS 112 may create or recreate a pooling (e.g., FabricPool by NetApp, such as to facilitate tiering of cold or inactive data to a less expensive storage tier like an object storage tier) storage configuration if not present already (or if the information has changed). Such pooling storage configuration may result in a composite aggregate storage configuration including a more expensive storage tier (such as a performance tier, as may be provided by SSDs on such a tier) for active or otherwise hot data, and a less expensive storage tier (such as a capacity tier, as may be provided by object storage on such a tier) for inactive or cold data. Finally, as part of action 206 the storage OS 112 may trigger an initialization (if this is for creating a first cloud snapshot) or an update (if this is for creating a subsequent cloud snapshot).

Further, the CMM 110 is informed that the transfer has started. In response, the CMM 110 may provide an update to the snapshot object 106 with some indication that a transfer of a snapshot is in progress. As the transfer is started, a snapshot is automatically created on the source volume 114 to replicate to the object store 116. As part of this, the snapshot may be stamped with the snapshot identifier provided in the POST from the CMM 110. When a cloud snapshot is created by the volume 114, and transfer to the object store 116 is idle, there is the one single snapshot on the source volume. However, if there is a transfer running, there may be two such snapshots (returning to one single snapshot once the transfer completes).

At action 208, the storage OS 112 may send one of two responses to the CMM 110 in response to the action 206. In a first example where a failure occurs, the storage OS 112 may send an error response to the CMM 110 indicating a failure to create the necessary configurations, failure to create the necessary relationships, and/or failure to start the transfer of the requested snapshot. When the CMM 110 receives an error message at action 208, the CMM 110 returns to action 204 and resends the POST along with all required payload data (at which point, the process flow 200 may proceed as otherwise laid out above and further below).

In a second example where the initiation of the transfer is successful, the storage OS 112 sends a success message to the CMM 110 indicating that the transfer of the snapshot was successfully initiated. The CMM 110 will then enter into loop 209 until the transfer is either completed or an error occurs.

At action 210, the CMM 110 sends a polling request to the storage OS 112 to check on the status of the transfer. This may be, for example, with a GET request to the storage OS 112. The GET request may include the snapshot UUID of the snapshot transfer currently in progress.

At action 212, the storage OS 112 may reply to the GET request with a status of either 'creating', 'created', or 'error'. In a first example, the storage OS 112 replies to the GET request with an 'error' status. When the CMM 110 receives a 'error' status, the CMM 110 exits loop 209 and returns to action 204 to resend the POST message and proceed as laid out above and below.

In a second example, at action 212 the storage OS 112 replies to the GET request with a 'creating' status. This corresponds, for example, to where the transfer is still in progress. The response message also contains the endpoint UUID, a create time, logical space required, bytes transferred, percent completed, and/or an HTTP status (e.g., status of 200). The endpoint UUID identifies the object store 116 that will hold the snapshot being transferred. The create time is the create time of the snapshot. The logical space required identifies the size of the volume. The bytes transferred is used by the snapshot object 106 to aid in calculating the percent complete for return to the user interface 102. The percent complete is used for comparison against the bytes transferred information. The HTTP status 200 is a standard success message.

In a third example, at action 212 the storage OS 112 replies to the GET request with a message having a 'created' status. This corresponds, for example, to where the transfer is completed to the object store 116. The response message may contain the endpoint UUID, snapshot create time, logical space required, percent complete set to 100, and the HTTP status 200.

At action 214, the CMM 110 will take appropriate action based on the response from the storage OS 112. Following the first example from action 212, the CMM 110 receives an 'error' response from the storage OS 112. The CMM 110 then exits loop 209 and returns to action 204 as stated above. In the second and third examples, the CMM 110 receives either a 'creating' or a 'created' status. In either case, the CMM 110 updates the snapshot object 106 with the information returned by the storage OS 112.

Figure 3:
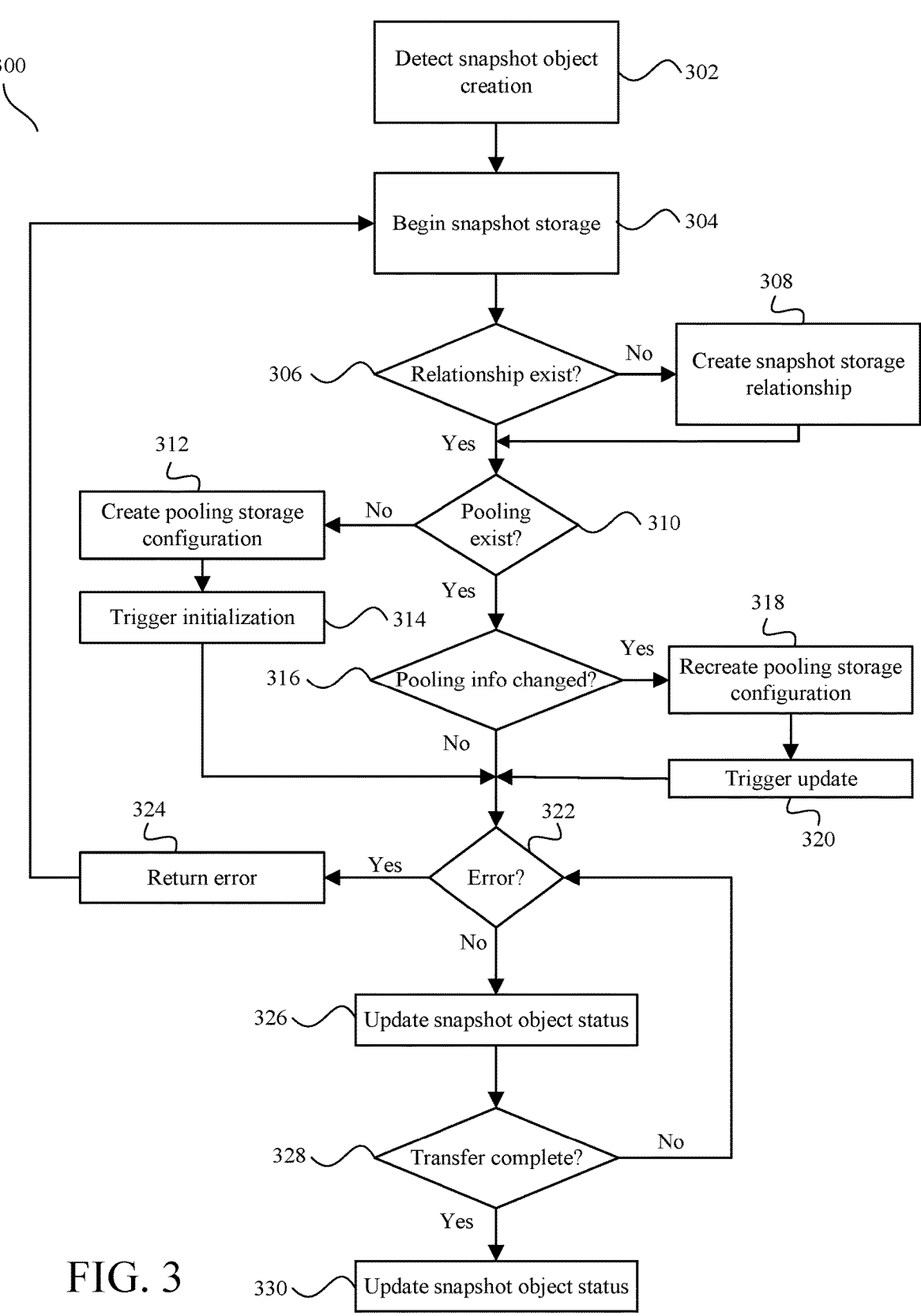
FIG. 3 illustrates a snapshot creation method according to some embodiments of the present description.

Turning to FIG. 3, a flow diagram of an exemplary snapshot creation method 300 is illustrated according to embodiments of the present disclosure. In the description of FIG. 3, reference is made to the elements of FIG. 1 for simplicity of illustration. In an embodiment, the method 300 may be implemented by container 108. As an example, the method 300 may be implemented by CMM 110 and storage OS 112 of container 108. It is understood that additional steps can be provided before, during, and after the steps of method 300, and that some of the steps described can be replaced or eliminated for other embodiments of the method 300.

At block 302, container 108 detects the creation of a snapshot object (e.g. snapshot object 106). The snapshot object represents a volume snapshot to be created for a selected volume (e.g. volume 104). In an embodiment, snapshot object 106 is created by CVS 104 in response to user input as discussed above in the description of FIG. 2. In an embodiment, CMM 110 of container 108 detects the creation of snapshot object 106.

At block 304, container 108 begins (or re-attempts in response to errors, as discussed further below) the process of creating a snapshot for a selected volume, in response to the detection at block 302. In an embodiment, CMM 110 of container 108 sends a message to storage OS 112 of container 108 to process the creation of the snapshot.

At decision block 306, container 108 determines whether a relationship exists between the selected volume (e.g. volume 114) and the object storage (e.g. object store 116) selected for storing the volume snapshot. In an embodiment, storage OS 112 within container 108 determines whether the relationship exists between the selected volume and the object storage. If a relationship does not exist, the method 300 proceeds to block 308 where a relationship is created between the selected volume and the selected object storage. After the relationship is created, method 300 proceeds to decision block 310.

If, instead, at decision block 306 it was determined that a relationship existed between the selected volume and the selected object storage, then the method 300 proceeds directly to decision block 310.

At decision block 310, container 108 determines whether a pooling storage configuration exists for storing the volume snapshot after it is created. In an embodiment, storage OS 112 determines whether a pooling storage configuration exists. If a pooling storage configuration does not exist, the method 300 proceeds to block 312.

At block 312, container 108 creates a pooling storage configuration (e.g., FabricPool by NetApp) for storing the volume snapshot after it is created. In an embodiment, storage OS 112 creates the pooling storage configuration.

At block 314, container 108 triggers an initialization of the pooling storage configuration. In an embodiment, storage OS 112 triggers the pooling storage configuration initialization. The method 300 proceeds from block 314 to decision block 322.

If, instead, at decision block 310, it was determined that a pooling storage configuration exists, method 300 proceeds to decision block 316.

At decision block 316, having determined that a pooling storage configuration exists, container 108 determines whether the pooling storage configuration information has changed. In an embodiment, storage OS 112 determines whether there has been a change to the pooling storage configuration information. If the pooling storage configuration information has changed, method 300 proceeds to block 318.

At block 318, container 108 recreates the pooling storage configuration based on the information that has changed. In some embodiments, storage OS 112 recreates the pooling storage configuration.

At block 320, container 108 triggers an update to the pooling storage configuration based on the changed information. The method 300 proceeds from block 320 to decision block 322.

If, instead, at decision block 316 it was determined that the pooling storage configuration was not changed, method 300 proceeds to decision block 322.

At decision block 322, having arrived from block 314, block 320, or decision block 316, container 108 determines whether an error has occurred in any of the previous steps. If an error has occurred, method 300 proceeds to block 324.

At block 324, the error causes method 300 to return to block 304 and begin the volume snapshot creation process again. In an embodiment, returning to block 304 includes storage OS 112 sending an error message to CMM 110. In another embodiment, returning to block 304 includes container 108 setting an error flag.

If, instead, at decision block 322, it was determined that no error occurred, method 300 proceeds to block 326.

At block 326, container 108 updates the status the snapshot object (e.g., snapshot object 106). In an embodiment, CMM 110 updates the snapshot object. For example, the status may be one of 'creating' or 'created'.

At decision block 328, container 108 determines whether the transfer of the volume snapshot to the selected object storage is complete and updates the selected snapshot object. If the transfer is not complete, method 300 returns to decision block 322 to determine whether an error has occurred. In an embodiment, storage OS 112 responds to a polling message from CMM 110 that the transfer is not complete. In an embodiment, CMM 110 updates the snapshot object with the status of the snapshot transfer.

If, instead, at decision block 328 it was determined that the transfer was complete, method 300 proceeds to block 330.

At block 330, container 108 updates the selected snapshot object status to complete (e.g., 'created'). In an embodiment, CMM 110 receives a transfer complete message from storage OS 112 and updates the snapshot object status.

Figure 4:
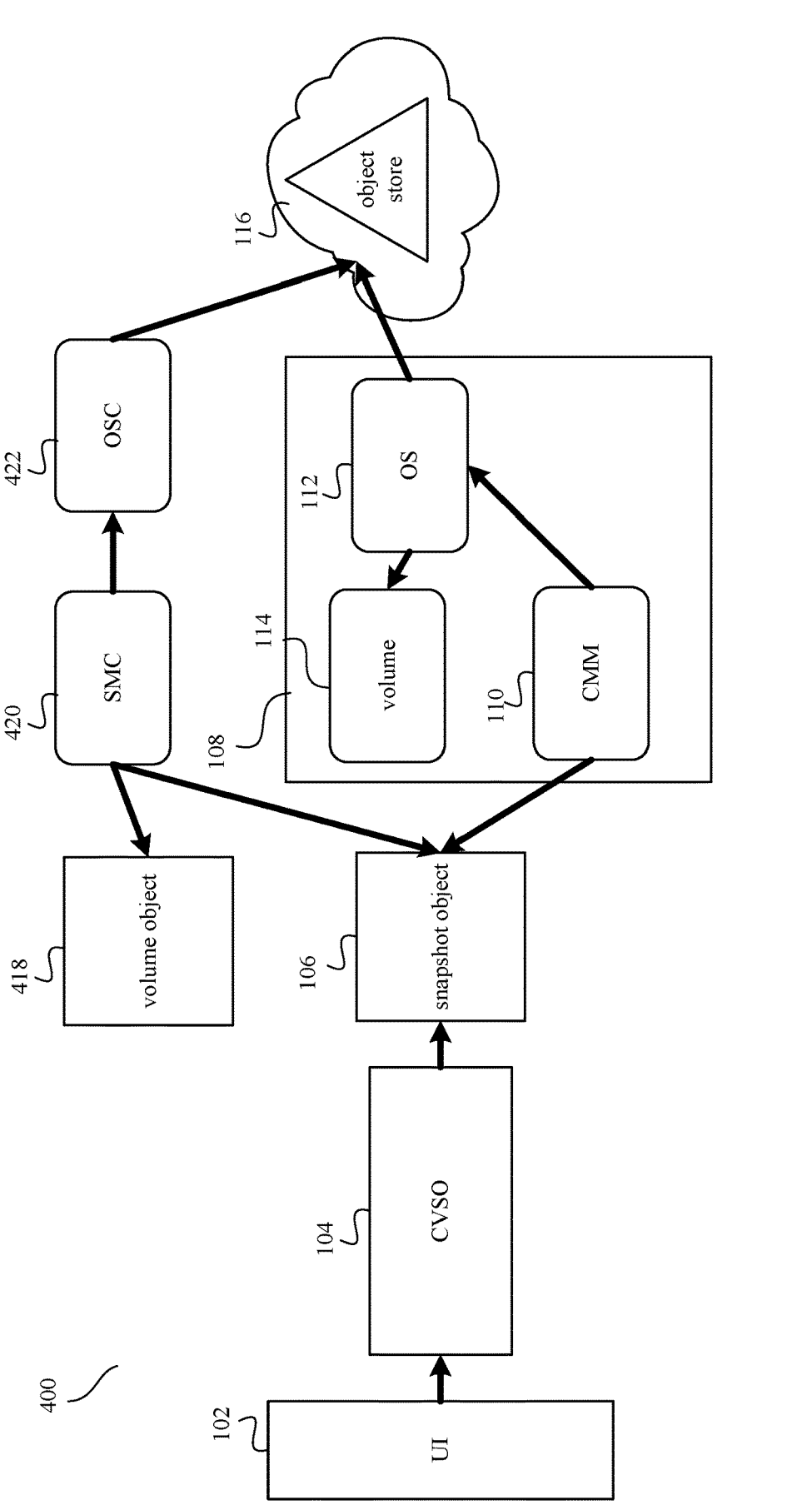
FIG. 4 illustrates a snapshot deletion architecture according to some embodiments of the present description.

Turning to FIG. 4, a snapshot deletion architecture 400 is illustrated according to embodiments of the present disclosure. In particular, the architecture 400 provides for deleting individual snapshots from the object store 116. Like elements to those introduced in FIG. 1 above will be used to describe FIG. 4 as well. Similar to FIG. 1, the snapshot deletion architecture 400 includes the user interface 102 in communication with the CVSO 104. The CVSO 104 generates snapshot objects 106 and, in the example of FIG. 4, may read information from snapshot object 106 pertaining to the snapshot associated with the snapshot object 106. As also discussed above, the container 108 may include the CMM 110, storage operating system (OS) 112, and volume 114. The CMM 110 monitors snapshot object 106 and communicates with storage OS 112 to delete a snapshot of volume 114 from the object store 116 (e.g., in response to a user request). Additionally, FIG. 4 illustrates a volume object 418, a snapshot monitoring controller (SMC) 420, and an object storage connector (OSC) 422.

In an embodiment, the snapshot deletion architecture 400 provides a user the ability to delete an individual snapshot of volume 114 from object store 116. In an embodiment, each snapshot is independent of the volume from which it was created, meaning that the snapshot can exists in the object store 116 after the original volume 114 has been destroyed. The user interface 102 provides a user the ability to select an individual snapshot to be deleted. The snapshot selection is sent to the CVSO 104. The CVSO 104 then updates the snapshot object 106 to mark the snapshot for deletion. The CMM 110 detects the update to the snapshot object 106 and sends a message to storage OS 112 to delete the selected snapshot from the object store 116.

Volume object 418 includes information about volume 114. In an embodiment, volume object 418 includes volume creation information, volume deletion information, and/or update information about volume 114. Additionally, the presence of volume object 418 may be used according to embodiments of the present disclose to serve as a flag that container 108 is still active and that volume 114 still exists. When container 108 is destroyed, destroying volume 114 along with it, volume object 418 is destroyed as well. Thus, the absence of volume object 418 serves as a flag that volume 114 does not exist in a container 108 anymore.

SMC 420 is a controller outside of container 108. SMC 420 may detect changes to snapshot object 106. In an embodiment, SMC 420 detects a change to snapshot object 106 marking the associated snapshot for deletion. SMC 420 may also monitor volume object 418. In an embodiment, SMC 420 checks where volume object 418 exists before performing any tasks. SMC 420 further communicates with OSC 422. In an embodiment, SMC 420 sends delete requests to OSC 422 in order to delete a snapshot from object store 116 in situations where the volume 114 has already been destroyed (e.g., because container 108 was destroyed).

OSC 422 may be another type of controller outside of container 108 that communicates with SMC 420 and object store 116. In an embodiment, OSC 422 receives a delete request from SMC 420 to delete a specified snapshot from object store 116 (e.g., where the container 108 has been destroyed and thus the delete request cannot be sent to a storage OS 112). OSC 422 then marks the specified snapshot for deletion. In an embodiment, the SMC 420 and the OSC 422 provide the same functionality as the CMM 110 and the storage OS 112 respectively with respect to deleting a snapshot from the object store 116. For example, the OSC 422 may include the same API (or collection of APIs) as is implemented in storage OS 112. As will be described below, the SMC 420 and the OSC 422 execute the snapshot delete functionality in response to a delete request for the volume 114 on the container 108 after the container 108 has been destroyed.

Figure 5:
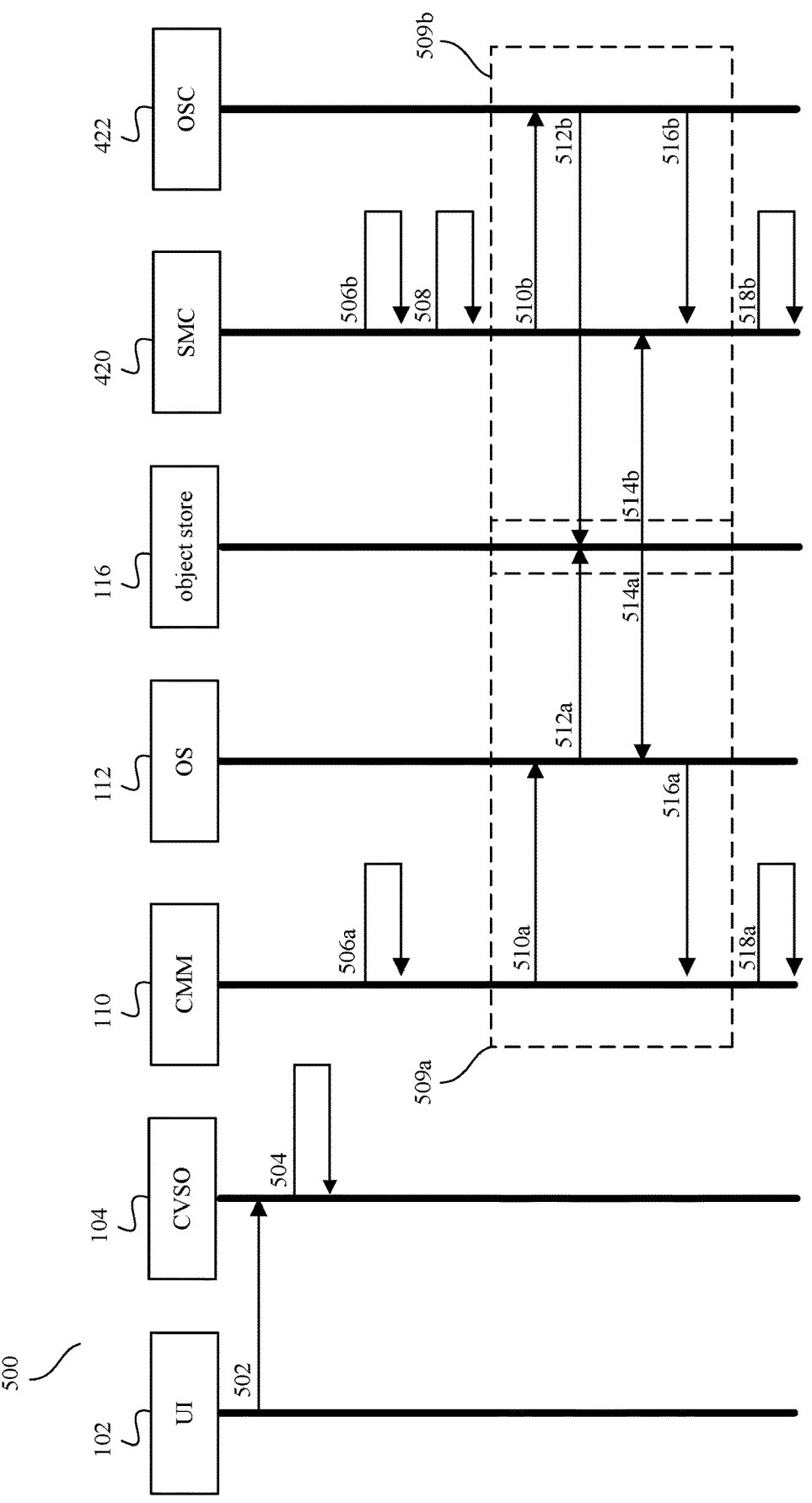
FIG. 5 illustrates a snapshot deletion process flow according to some embodiments of the present description.

Turning to FIG. 5, a snapshot deletion process flow 500 is provided. The snapshot delete process flow 500 shows communications between user interface 102, CVSO 104, CMM 110, storage OS 112, SMC 420, and OSC 422, object store 116. In an embodiment, a user may select a snapshot to be deleted while the container 108 and volume 114 exists. In another embodiment, the user may select a snapshot to be deleted after container 108 and volume 114 have been destroyed. The process flow 500 covers both scenarios, as discussed below.

At action 502, a user selects a snapshot to be deleted, such as via user interface 102. The user interface 102 sends a message to CVSO 104 identifying the selected volume for deletion. The selected snapshot is identified, for example, by the snapshot UUID.

At action 504, the CVSO 104 marks the snapshot object 106 that corresponds to the selected snapshot for deletion. For example, the snapshot object 106 is marked for deletion, and not actually deleted, until the corresponding snapshot is removed from the object store 116. In an embodiment, a flag is set in snapshot object 106 to prevent it from being deleted until this occurs.

At action 506a, the CMM 110 detects that snapshot object 106 is marked for deletion.

At action 506b, the SMC 420 likewise detects that snapshot object 106 is marked for deletion. Both the CMM 110, if present (e.g., where the container 108 in which CMM 110 exists has not been destroyed yet), and SMC 420 track the state of the snapshot object 106. Actions 506a and 506b may occur at approximately the same time as each other, or at different times than each other.

At action 508, the SMC 420 checks for the existence of volume object 418 (e.g., in response to detecting the mark for deletion of the snapshot object 106 at action 506b). In an embodiment, the volume object 418 exists when container 108 and volume 114 exists. When container 108 and by extension volume 114 are destroyed, volume object 418 is also destroyed. According to embodiments of the present disclosure, if the SMC 420 determines that the volume object 418 still exists, the SMC 420 stops and does nothing further to handle the delete request. The process flow 500 will instead continue with loop 509a and actions 510a-518a with respect to CMM 110 to process the delete request.

At action 510a (within the loop 509a), the CMM 110 sends a delete message to storage OS 112. The delete message may contain, for example, the snapshot UUID associated with the snapshot to be deleted.

At action 512a, in response to receiving the delete message from the CMM 110, the storage OS 112 may send a delete message containing the snapshot UUID (obtained from the delete message from CMM 110) to object store 116. In an example where the selected snapshot is not the only snapshot, the storage OS 112 will cause the delete message to request deletion of all objects unique to the selected snapshot. The delete request may trigger an asynchronous garbage collection of object store 116. The asynchronous garbage collection removes, for example, the deleted objects from the object store 116.

At action 514a, the object store 116 returns a status of found or not found. In an example, the object store 116 responds with a status of found until the garbage collection has completed. Once all objects unique to the selected snapshot have been removed by the garbage collector, the object store 116 returns a status of not found.

In an example where the selected snapshot is the only snapshot, the storage OS 112 will delete all objects associated with the volume 114. In this example, the deletion may not be considered successful until all objects associated with volume 114 have been deleted from object store 116. In an embodiment, no new snapshots can be created until the object store 116 has completely removed all objects associated with the volume 114.

In another example, the selected snapshot is the latest, or most recent, snapshot to be created and the selected snapshot is not the only snapshot. In this example, the storage OS 112 instead marks the snapshot as 'pending for deletion' and returns a status of not found without running the garbage collector or waiting for the objects to be deleted (in other words, the storage OS 112 returns that deletion succeeded to the caller). As a result, the objects unique to the latest snapshot remain in the object store 116 to avoid requiring the next snapshot to be a 'baseline' snapshot. The selected snapshot will remain marked as 'pending for deletion' until the next snapshot is created. Once a next snapshot is created, the new 'incremental' snapshot will replace the removed snapshot and the deleted snapshot will be marked for deletion and removed by the garbage collector.

At action 516a, the storage OS 112 responds to the CMM 110 with a status message (e.g., in response to action 514a). The status will either be a status of not found, such as an HTTP Status 404, or a status of found, such as an HTTP Status 200. If the status is anything other than not found, the CMM 110 stays in loop 509a, returns to action 510a, and sends the delete request again. In an embodiment, the status of not found will be returned only after the object store 116 garbage collection has completed.

Once the status of not found is returned, the CMM 110 exits loop 509a and moves to action 518a.

At action 518a, the CMM 110 finalizes the deletion of the snapshot object 106. In an embodiment, the CMM 110 removes the flag that was set to prevent the snapshot object 106 from being deleted.

Returning to action 508, if the SMC 420 does not detect the volume object 418 (e.g., because it has been destroyed), then the process flow 500 instead continues with loop 509b and corresponding actions 510b-518b. In this alternative, volume object 418 has been destroyed because the container 108, and therefore volume 114, has been destroyed. In this example, because the container 108 has already been destroyed and does not exist anymore, the CMM 110 also does not exist anymore. With the CMM 110 destroyed with the destruction of the container 108, the process flow 500 instead relies upon the SMC 420 to facilitate deletion of the selected snapshot.

At action 510b, the SMC 420 sends a delete message to OSC 422. This is done in response to the marking of snapshot object 106 for deletion. The delete message contains, for example, the snapshot UUID associated with the snapshot to be deleted (similar to action 510a, but from SMC 420).

At action 512b, the OSC 422 sends a delete message containing the snapshot UUID to object store 116. Just as described with respect to loop 509a, where the selected snapshot is not the only snapshot, the OSC 422 will delete all objects unique to the selected snapshot. In an embodiment, the delete request triggers an asynchronous garbage collection of object store 116. The asynchronous garbage collection removes the deleted objects from the object store 116. In another embodiment, the OSC 422 marks the selected snapshot as deleted, without triggering the asynchronous garbage collection, and returns a status of not found. All snapshot objects marked for deletion may be deleted when all snapshots associated with the volume are deleted.

At action 514b, the object store 116 returns a status of found or not found. In an example, the object store 116 responds with a status of found until the garbage collection has completed. Once all objects unique to the selected snapshot have been removed by the garbage collector, the object store 116 returns a status of not found.

In an example where the selected snapshot for deletion is the only snapshot, the OSC 422 will delete all objects associated with the volume 114 in response to the garbage collection. In this example, the deletion is not successful until all objects associated with volume 114 have been deleted from object store 116. As already noted, in this example the volume 114 does not exist. Therefore, the OSC 422 does not need to prevent new snapshots from being created as was the case with the storage OS 112 deleting the only snapshot.

In another example, the selected snapshot for deletion is the latest, or most recent, snapshot to be created and the selected snapshot is not the only snapshot. In this example, the OSC 422 deletes the snapshot as it would any other snapshot because the volume 114 is destroyed, therefore no new snapshots will be made.

At action 516b, the OSC 422 responds to the SMC 420 with a status message. The status will either be a status of not found, such as an HTTP Status 404, or a status of found, such as an HTTP Status 200. If the status is anything other than not found, or HTTP Status 404, the SMC 420 stays in loop 509b, returns to action 510b, and sends the delete request again. In an embodiment, the status of not found will be returned only after the object store 116 garbage collection has completed.

Once the status of not found is returned, the SMC 420 exits loop 509b and moves to action 518b.

At action 518b, the SMC 420 finalizes the deletion of the snapshot object 106. In an embodiment, the SMC 420 removes the flag that was set to prevent the snapshot object 106 from being deleted.

Whether through the storage OS 112 or OSC 422, deletion of the last cloud snapshot associated with a volume may trigger a special case of deletion handling, sometimes referred to as endpoint deletion. This operation deletes all objects associated with the volume from the object store 116. This may be viewed as equivalent to removing the relationship between the volume and the object store 116, as well as cleaning up any reference to the relationship. Just as with the deletion actions discussed above, a response (e.g., a REST response) will indicate not found when the deletion is complete. If deletion of the last snapshot was triggered from storage OS 112, then new snapshot creation operations may be prevented until the endpoint deletion operation completes.

Figure 6A:
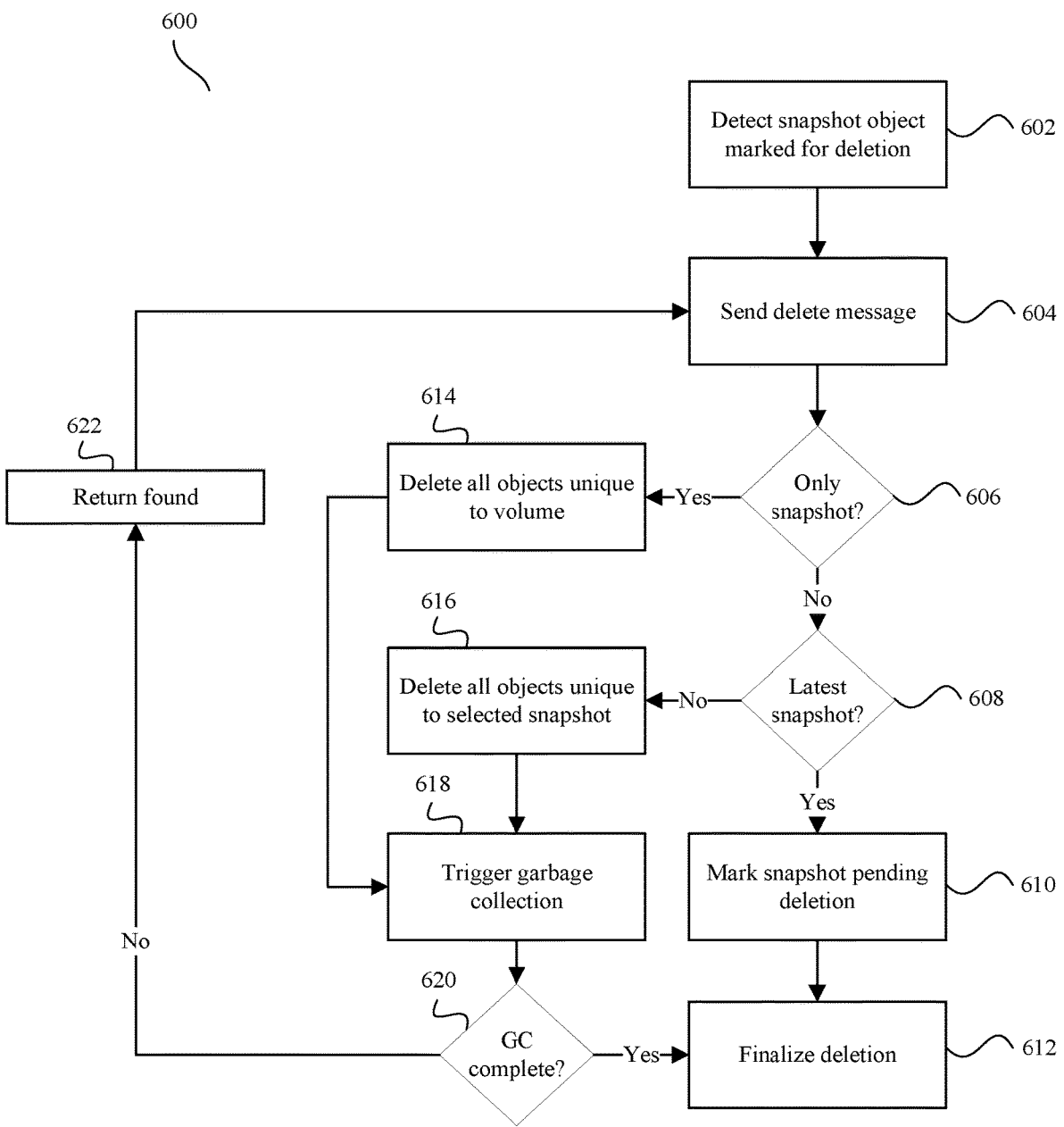
FIGS. 6A and 6B illustrate snapshot deletion methods according to some embodiments of the present description.
Figure 6B:
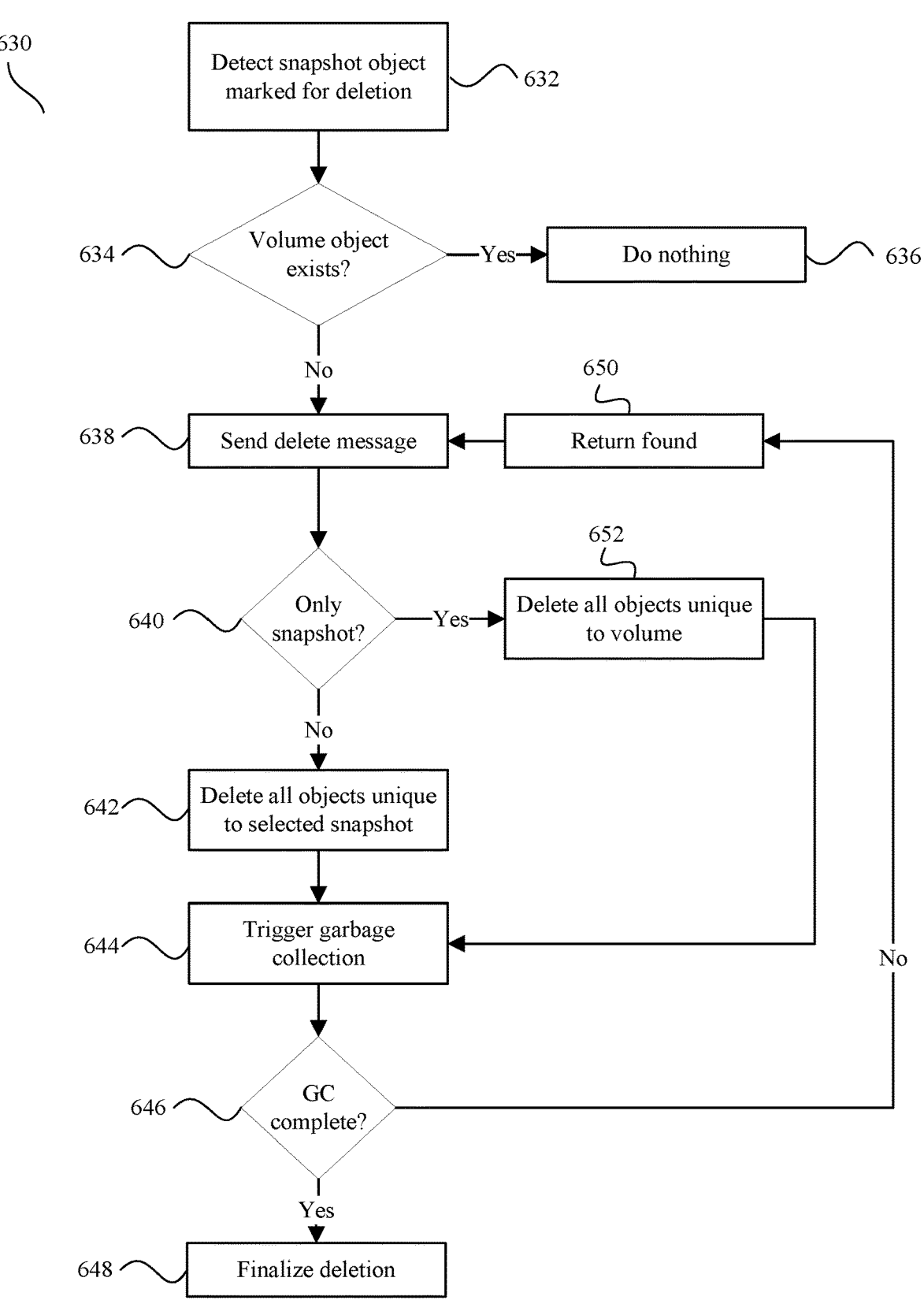

Referring to FIGS. 6A and 6B, flow diagrams of exemplary snapshot delete methods 600 and 630, respectively are illustrated according to embodiments of the present disclosure. In the descriptions of FIGS. 6A and 6B, reference is made to the elements of FIG. 4 for simplicity of illustration. In an embodiment, the methods 600 and 630 may be implemented by container 108. In another embodiment, for example FIG. 6A, the method 600 may be implemented by CMM 110 and storage OS 112 of container 108. In another embodiment, for example FIG. 6B, the method 630 may be implemented by SMC 420 and OSC 422. It is understood that additional steps can be provided before, during, and after the steps of methods 600 and/or 630, and that some of the steps described can be replaced or eliminated for other embodiments of the method 600 and/or 630.

Looking first at FIG. 6A, container 108, including volume 114, exists and is available to process snapshot delete requests from a user.

At block 602, container 108 detects that the selected snapshot object (e.g., snapshot object 106) has been marked for deletion. The selected snapshot object 106 is unique to a volume snapshot in an object storage (e.g. object store 116). In an embodiment, CMM 110 detects that the selected snapshot object 106 was marked for deletion. The selected snapshot object 106 may be marked for deletion by CVSO 104 in response to user input. At this point the selected snapshot object 106 is updated to prevent deletion of the selected snapshot object 106 until the volume snapshot identified by the selected snapshot object 106 is deleted from the selected object storage 116. In an embodiment, a flag may be set in the selected snapshot object 106 to prevent deletion of the snapshot object 106 until complete.

At block 604, container 108 sends a delete message to the object store 116 identified by the selected snapshot object, requesting the selected volume snapshot be deleted. In an embodiment, CMM 110 sends a delete message to storage OS 112 and storage OS 112 sends a delete message to object store 116. The delete message may be sent repeatedly until the volume snapshot is deleted from the object store 116.

At decision block 606, container 108 determines whether the snapshot selected for deletion is the only snapshot of the selected volume in the object store 116. In an embodiment, storage OS 112 determines whether the selected snapshot is the only snapshot. If the selected snapshot is not the only snapshot, method 600 proceeds to decision block 608.

At decision block 608, container 108 determines whether the snapshot selected for deletion is the latest (or most recent) snapshot in the object store 116. In an embodiment, storage OS 112 determines whether the selected snapshot is the latest snapshot. If the selected snapshot is the latest snapshot, method 600 proceeds to block 610.

At block 610, container 108 marks the volume snapshot selected for deletion as pending deletion in the object store 116. In an embodiment, storage OS 112 marks the snapshot as pending deletion. At this point, the selected volume snapshot is only marked pending deletion and will not be deleted until the next volume snapshot is created. By waiting to delete the latest volume snapshot, the differences between the latest volume snapshot and the previous volume snapshot are preserved and stored in the next volume snapshot. This process avoids using the time and network bandwidth to store a new baseline volume snapshot in the object store 116.

At block 612, container 108 finalizes the snapshot deletion. This includes the selected snapshot object 106 being updated to allow the snapshot object 106 to be deleted. The selected snapshot object 106 is then deleted. In an embodiment, the flag previously set in the selected snapshot object 106 is removed allowing the selected snapshot object 106 to be deleted. In an embodiment, storage OS 112 sends a delete complete, or snapshot not found, message to CMM 110 and then CMM 110 performs the tasks required to finalize deletion of the selected snapshot, including updating and deleting the selected snapshot object 106.

Returning to decision block 606, if, instead, it is determined that the selected snapshot is the only snapshot in the object storage, method 600 proceeds to block 614.

At block 614, container 108 deletes all objects in the object store 116 that are unique to the volume associated with the selected snapshot. In an embodiment, storage OS 112 deletes all of the unique volume objects.

At block 618, container 108 triggers an asynchronous garbage collection. The asynchronous garbage collection removes all deleted objects. In an embodiment, storage OS 112 triggers the garbage collection.

At decision block 620, container 108 determines whether the asynchronous garbage collection has completed. Container 108 may request a status of garbage collection from the object store 116. In an embodiment, storage OS 112 may request the status of the garbage collection. If the garbage collection is not complete, method 600 proceeds to block 622.

At block 622, a status of found is returned to container 108. In an embodiment, container 108 updates the status of the selected snapshot object 106 in response to the found status. In an embodiment, storage OS 112 sends a status of found to CMM 110 in response to the garbage collection still running and CMM 110 updates the selected snapshot object 106 with the current status. The method 600 then proceeds to block 604 where the delete message is sent and the method 600 proceeds as discussed above and further below to complete deletion of the snapshot in object store 116.

If, instead, it was determined at decision block 620 that the garbage collection was complete, the method 600 proceeds to block 612 and finalizes the snapshot deletion as described above.

Returning to decision block 608, if it was instead determined that the selected snapshot was not the latest, or most recent, snapshot, the method 600 proceeds to block 616.

At block 616, container 108 deletes all objects in the object store 116 that are unique to the selected snapshot for deletion. In an embodiment, storage OS 112 deletes all of the objects unique to the selected snapshot. Method 600 then proceeds to block 618 where the asynchronous garbage collection is triggered as described above.

Method 600 has been described in a situation where container 108, including volume 114, exists and is available to process snapshot delete requests from a user. Turning to FIG. 6B, container 108, including volume 114, has been destroyed and is not available to process snapshot delete requests from a user. The actions of method 630, as illustrated in FIG. 6B, are handled by processes outside of container 108, such as SMC 420.

At block, 632 a process outside of container 108 detects that the selected snapshot object (e.g. snapshot object 106) was marked for deletion. In an embodiment, SMC 420 detects that the selected snapshot object 106 was marked for deletion. In an embodiment, CVSO 104 marks the selected snapshot object 106 for deletion in response to user input. The selected snapshot object 106 is updated to prevent it from being deleted until the select volume snapshot in the selected object store 116 is deleted.

At decision block 634, SMC 420 determines whether a volume object associated with the selected snapshot object 106 exists. The volume object acts as an indicator of whether the associated volume (e.g. volume 114) still exists inside its corresponding container (e.g. container 108). If the volume object exists, method 600 proceeds to block 636.

At block 636, method 630 may end in favor of processing the deletion as discussed above in the description for FIG. 6A.

If, instead, it was determined at decision block 634 that the associated volume object was not present, the method 600 proceeds to block 638.

At block 638, SMC 420 sends a delete message to the object store 116 identified by the selected snapshot object 106. In an embodiment, SMC 420 sends a delete message to OSC 422 and then OSC 422 sends the delete message to object store 116.

At decision block 640, if it is determined that the selected snapshot is not the only snapshot of the identified volume, the method 630 continues to block 642.

At block 642, a delete message is sent to the selected object store 116 to delete all objects unique to the selected snapshot. In an embodiment, OSC 422 sends the delete message to the selected object store 116.

At block 644, the asynchronous garbage collection of the selected object store 116 is triggered. In an embodiment, OSC 422 triggers the asynchronous garbage collection. The asynchronous garbage collection removes all objects unique to the selected snapshot and returns a status of found until all objects are removed. In another embodiment, OSC 422 marks all objects unique to the selected snapshot as deleted, without triggering the asynchronous garbage collection. In such embodiments, the objects marked for deletion may be deleted when all snapshots associated with the volume are deleted (e.g., when all of the data of the volume is deleted).

At decision block 646, if it is determined that the garbage collection is completed (e.g. returns a status of not found), the method 630 proceeds to block 648. In embodiments where the objects are marked for deletion without triggering garbage collection, the garbage collection is considered completed and the process proceeds to block 648.

At block 648, deletion of the selected snapshot object 106 is finalized. The selected snapshot object 106 is updated to allow it to be deleted. In an embodiment, the OSC 422 returns a not found, or deletion complete, message to SMC 420 and SMC 420 updates the selected snapshot object 106. The selected snapshot object is then deleted.

Returning to decision block 646, if, instead, it was determined that the garbage collection was not complete, the method 630 proceeds to block 650.

At block 650, a status of found is received from the selected object store 116. In an embodiment, the OSC 422 receives the status of found, or not complete, and sends a message to the SMC 420 indicating that the snapshot deletion is not complete. The method 630 then proceeds to block 638 and proceeds through steps 638-652 as appropriate until the selected snapshot is completely removed from the selected object store 116.

Returning to decision block 640, if, instead, it was determined that the selected snapshot is the only snapshot of the corresponding volume in the selected object store 116, the method 630 proceeds to block 652.

At block 652, all objects unique to the volume identified by the selected snapshot object 106 are deleted from the selected object store 116. In an embodiment, OSC 422 sends a message to the selected object store 116 to delete all objects unique to the volume identified by the selected snapshot object 106. The method 630 then proceeds to block 644 to trigger the asynchronous garbage collection.

Figure 7:
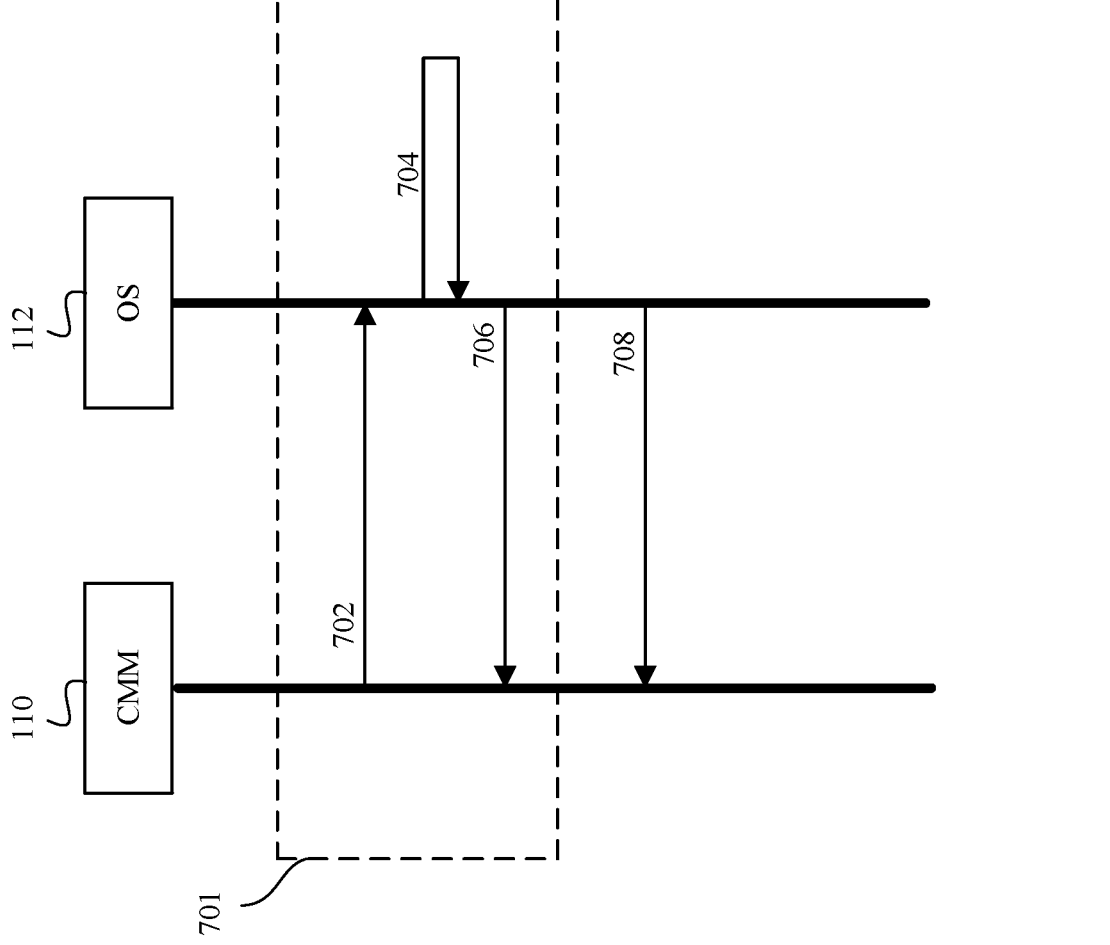
FIG. 7 illustrates a snapshot creation abort process flow according to some embodiments of the present description.
Figure 7:

In addition to snapshot creation and deletion, embodiments of the present disclosure also describe a snapshot creation abort process flow. This is illustrated as abort process flow 700 in FIG. 7 for when a user chooses to abort a snapshot creation (e.g., during a process flow 200). This scenario may occur when transfer progress cannot be made. This may occur in situations such as network issues, authentication issues, etc. Another example may be when the creation may be aborted because the CVSO 104 times out after a long period of time of inactivity or because the user manually aborts the creation process.

At action 702, the CMM 110 enters loop 701 and sends a delete request to the storage OS 112. The delete request contains the snapshot UUID for the snapshot which is currently being created. The CMM 110 retrieves the snapshot UUID from the snapshot object 106 associated with the snapshot being created that is to be aborted.

At action 704, the storage OS 112 determines whether the transfer of the snapshot associated with the snapshot UUID is currently running. The transfer of the snapshot is currently running, for example, when data is being actively transferred to the object store 116 by the storage OS 112. When data is actively being transferred, the storage OS 112 triggers a soft abort, stopping the transfer.

At action 706, the storage OS 112 returns a status of success, ok, 200, or another suitable success response.

As an alternative, returning to action 702, the CMM 110 sends a delete request to the storage OS 112 containing the snapshot UUID of selected snapshot to be aborted, just as noted above. But at action 704, instead of a soft abort, a hard abort will be triggered.

Specifically, at action 704, the storage OS 112 determines that the transfer is not running. That is, the transfer of data to the object store 116 has stopped. The transfer may have stopped, for example, because of a network connectivity issue. As another example, the transfer may have stopped because of authentication issues or any other issue. As yet another example, the transfer may have stopped because a soft abort was previously issued. Whatever the particular reason for having stopped, the storage OS 112 triggers a hard abort to cancel the snapshot creation. In an embodiment, the hard abort removes any checkpoint metadata that has been created during the snapshot transfer process.

At action 706, the storage OS 112 returns a status of success.

As another alternative, returning to action 702, the CMM 110 sends a delete request to the storage OS 112 containing the snapshot UUID of selected snapshot to be aborted.

At action 704, the storage OS 112 determines that both a soft abort and a hard abort have completed. Because of this, the storage OS 112 updates the internal snapshot metadata status of the pending snapshot.

At action 706, the storage OS 112 returns a status of success in response to action 704 (with the metadata update).

At action 708, after the previous processes have completed in loop 701, the storage OS 112 returns a status of not found. This indicates that the snapshot creation has successfully aborted.

Figure 8:
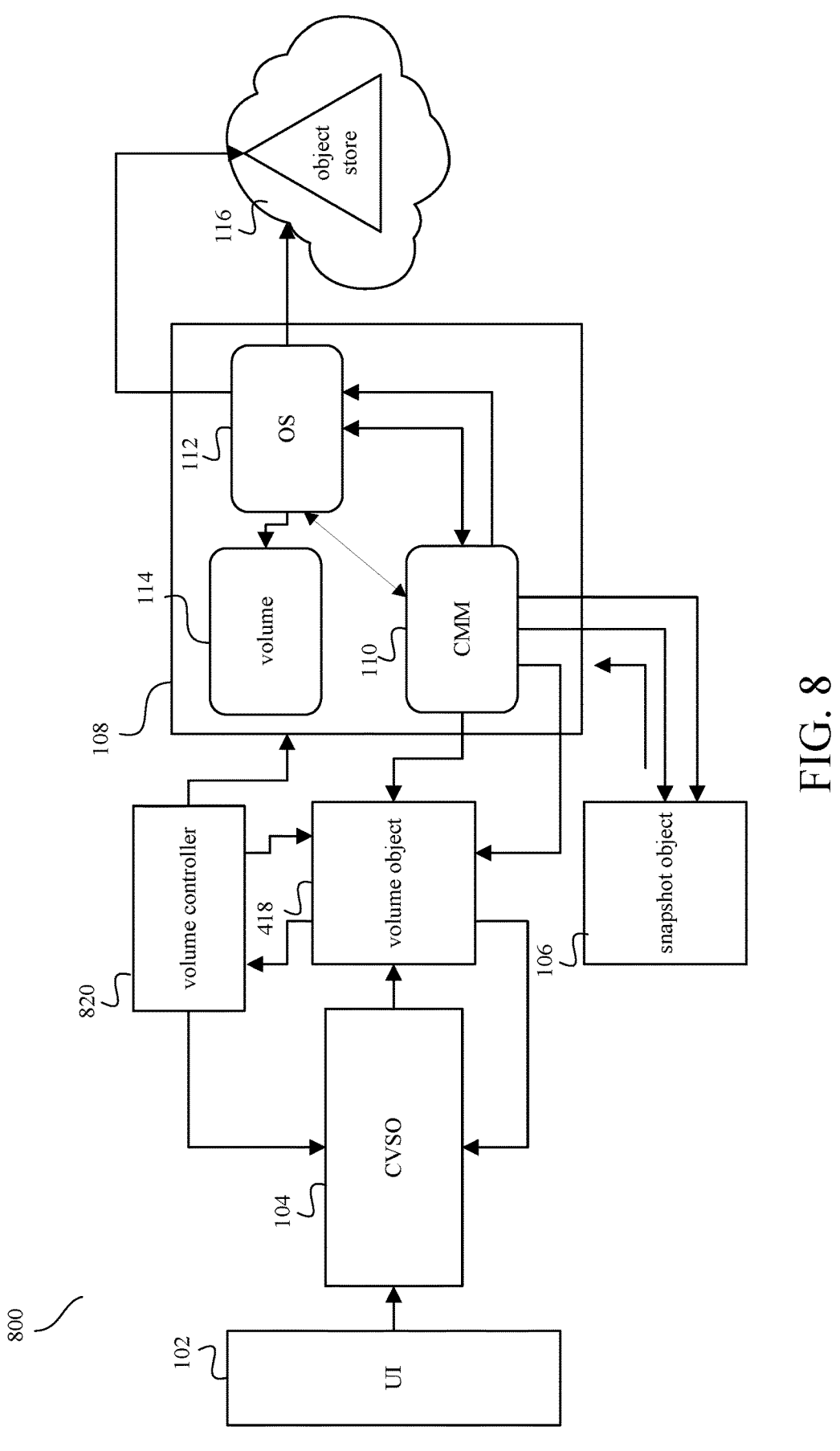
FIG. 8 illustrates a snapshot restore flow diagram of an exemplary restore from snapshot process according to some embodiments of the present description.

Turning to FIG. 8, a snapshot restore flow 800 diagram is illustrated of an exemplary restore from snapshot process according to some embodiments of the present description. Elements similar to those introduced in FIGS. 1 and/or 4 above are reproduced in FIG. 8, along with additional elements.

For example, the user interface 102 allows the user to select a snapshot to restore. The user interface 102 sends the user selection to the CVSO 104. The CVSO 104 creates a volume object 418. The CVSO 104 stores the snapshot UUID in the volume object 418. The CVSO 104 copies the endpoint UUID and logical space information stored in the snapshot object 106 during snapshot creation and to the volume object 418.

A volume controller 820 detects the creation of the volume object 418. The volume controller 820 retrieves the snapshot UUID, the endpoint UUID, and the logical space required from the volume object 418. The volume controller 820 allocates space for the creation of a new container 108. In an embodiment, the volume controller 820 allocates a percentage amount of space, e.g. 30% more space (as just an example) than the logical space for the container 108. The volume controller 820 then creates a new container 108 according to the information retrieved.

After creating the new container 108, the volume controller 820 starts an instance of the CMM 110 within the container 108. Further, the volume controller 820 also starts an instance of the storage OS 112 within the container 108. A new volume 114 for storing the restored snapshot is created within container 108. In an embodiment, the new volume 114 is created as a partially restored volume as part of an on-demand restore (e.g., as illustrated with respect to FIG. 10). A partially restored volume, while usable by a client, is slower than a fully restored volume until all of the data for the volume is restored over time. The volume controller 820 then updates the volume status in the volume object 418 to 'offline'. The volume 114 is not usable at this point. The current state of the volume 114, 'offline', will be returned to any response for a status request (e.g. a volume GET).

The CMM 110 retrieves the endpoint details (i.e. endpoint UUID and authentication) from the snapshot object 106. The information is then passed to the storage OS 112 to begin restoration of the selected snapshot. The CMM 110 updates the snapshot object 106 by incrementing a count to prevent deletion of the snapshot object 106 during the restore process. That is, the selected snapshot in the object store 116 is locked and cannot be deleted during the restoration process. The CMM 110 sends a request including endpoint and snapshot details (e.g. endpoint UUID and snapshot UUID) to the storage OS 112. The storage OS 112 then begins the partial restore of volume 114 from the selected snapshot.

During the restoration process, the CMM 110 periodically polls the storage OS 112 for restoration progress using GET calls. A state of 'preparing' will be returned during the initial setup phase of the restoration process. In an embodiment, the CMM 110 updates the volume object 418 with the restoration state during the restoration process. The volume 114 may be a read only volume during the 'preparing' state.

Next, a state of 'restoring' will be returned as the restoration progresses. During the 'restoring' phase the volume 114 is considered mountable and usable by the client. The CMM 110 updates the volume object 418 to indicate that the volume 114 is ready to be mounted by a client. The storage OS 112 converts volume 114 to a read-write volume. In an embodiment, the volume 114, while usable during the 'restoring' state, will have a lower performance than a fully restored volume.

The volume controller 820 detects the state change in the volume object 418 and creates an event to be detected by the CVSO 104. When the CVSO 104 detects the generated event, the CVSO 104 updates the user interface 102 to indicate that the volume 114 is online. The user interface 102 then updates an indicator for the user to see that volume 114 is online.

The storage OS 112 continues the restoration process, pulling data from the object store 116 to populate the volume 114. The CMM 110 periodically polls the storage OS 112 to get the status of the restoration process. In an embodiment, the request is a GET request.

After restoration is complete, the storage OS 112 converts the state of volume 114 from a 'partially restored' volume to a 'fully restored' volume. Any performance limitations that the volume 114 had during the 'partially restored' state are removed as a result of the completion of restoration. The performance of the volume 114 in the 'fully restored' state is better than when it was in the 'partially restored' state. The storage OS 112 sends a 'restored' state in response to the GET polling of the CMM 110. The CMM 110 then decrements the refcount in the snapshot object 106, indicating that the restoration process is complete. Decrementing the refcount removes the restriction on deleting the snapshot object 106 and the snapshot in the object store 116 that is associated with the snapshot object 106.

The snapshot restoration process is set up to handle errors that occur during the restoration process. Storage OS 112 reboot or loss of connectivity to the object store 116 may cause a failure during the partially restored state. Restoration may end with an error of the snapshot being restored is corrupt or otherwise bad. An error will occur if the storage OS 116 reboots or loses connectivity with the object store 116 during the background data pull (i.e. the 'restoring' state while the volume 114 is partially restored). An error will occur if the storage OS 112 runs out of space during the restoration process. An inconsistency in the local/cached blocks will cause an error.

Figure 9:
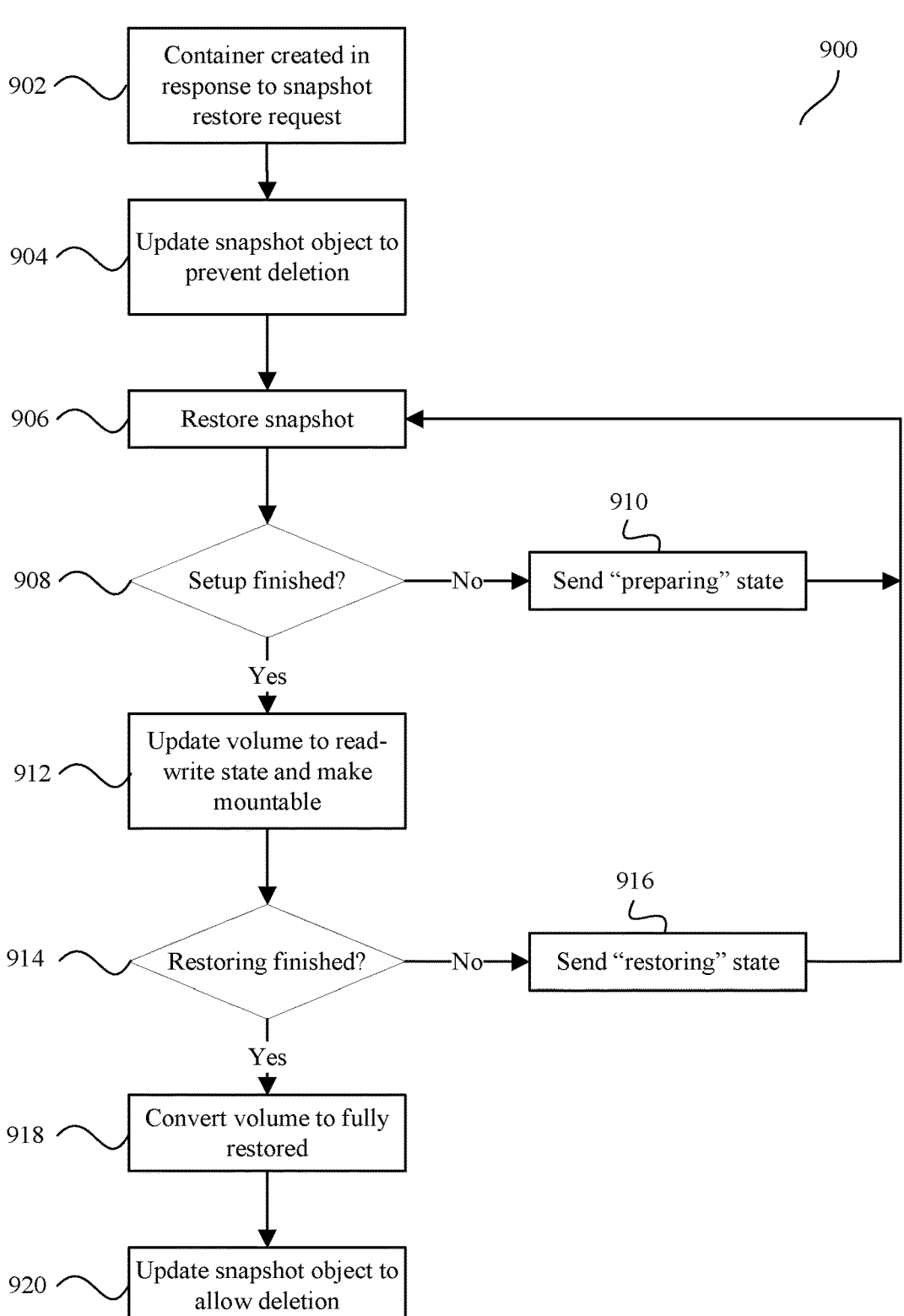
FIG. 9 illustrates a snapshot restore method of an exemplary restore from snapshot process according to some embodiments of the present description.

FIG. 9 illustrates a flow diagram of an exemplary snapshot restore method 900 according to embodiments of the present disclosure. In the description of FIG. 9, reference is made to the elements of FIG. 8 for simplicity of illustration. In an embodiment, the method 900 may be implemented by container 108. In another embodiment, the method 900 may be implemented by CMM 110 and storage OS 112 of container 108. It is understood that additional steps can be provided before, during, and after the steps of method 900, and that some of the steps described can be replaced or eliminated for other embodiments of the method 900.

At block 902, a container is created in response to user input to restore a selected volume snapshot from a selected object storage (e.g. object store 116). The selected volume snapshot is identified by a snapshot object (e.g. snapshot object 106). In an embodiment, volume controller 820 detects the creation of a volume object (e.g. volume object 418) and retrieves snapshot information from the volume object in order to create a container (e.g. container 108). In an embodiment, after the container is created, an instance of CMM 110 and storage OS 112 are instantiated and a volume (e.g. volume 114) is created within the container.

At block 904, the container 108 updates the snapshot object 106 identifying the selected snapshot that is being restored. The snapshot object 106 is updated to prevent the snapshot object 106 from being deleted during the restoration process. In an embodiment, CMM 110 updates the snapshot object 106.

At block 906, the container 108 begins the restoration of the snapshot. In an embodiment, a restore message is sent, such as from CMM 110 to storage OS 112. In an embodiment, storage OS 112 copies snapshot data from the object store 116 to the volume (e.g. volume 114). In an embodiment, CMM 110 requests a restoration status from storage OS 112.

At decision block 908, if it is determined that the initial setup is not complete (e.g., by container 108), the method 900 proceeds to block 910.

At block 910, the container 108 updates the state of the volume object to 'preparing.' In an embodiment, storage OS 112 returns a 'preparing' status message in response to a request from CMM 110, and CMM 110 updates the volume object state to 'preparing.' The method 900 then proceeds to block 906 where a restore message is again sent.

Returning to decision block 908, if, instead, it was determined that the initial setup was complete, the method 900 proceeds to block 912.

At block 912, the container 108 updates the volume to be a read-write volume (for example), makes the volume mountable, and updates the volume object to a read-write state. In an embodiment, storage OS 112 updates the volume (e.g. volume 114) to a read-write state. In an embodiment, CMM 110 updates the volume object to a status of mountable. In an embodiment, the volume will be accessible but will have limited performance when compared to a fully restored volume.

At decision block 914, if it is determined that the restoration is not finished, the method 900 proceeds to block 916.

At block 916, the container 108 updates the state of the volume object to 'restoring.' In an embodiment, storage OS 112 returns a 'preparing' status message in response to a status request message from CMM 110, and CMM 110 updates the state of the volume object to 'restoring.' The method 900 then proceeds to block 906 where a restore message is again sent.

Returning to decision block 914, if, instead, it was determined that the restoration was finished, the method 900 proceeds to block 918.

At block 918, the container 108 converts the volume to a fully restored volume. In an embodiment, storage OS 112 converts volume 114 to a fully restored volume. The restored volume may have all performance restrictions removed, for example.

At block 920, the container 108 updates the snapshot object to remove the delete restriction. In an embodiment, CMM 110 updates the snapshot object state in response to a fully restored message received from storage OS 112.

Figure 10:
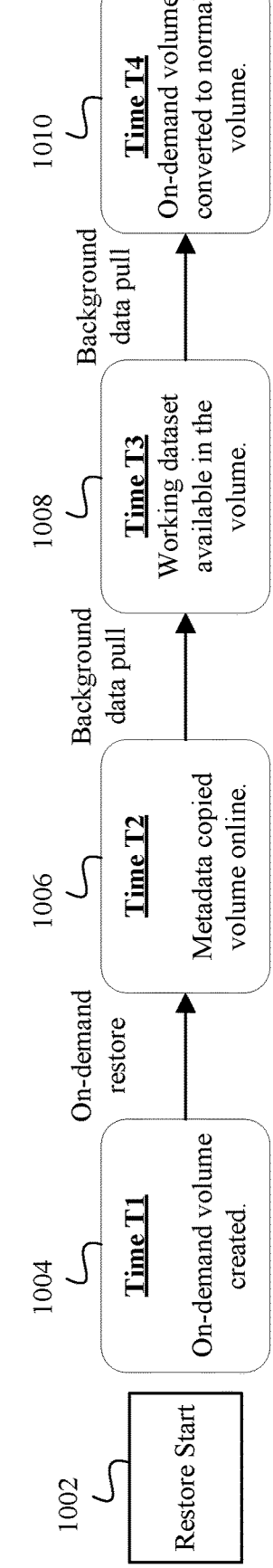
FIG. 10 illustrates a restoration flow chart showing exemplary states used during an on-demand restoration process according to some embodiments of the present description.

Turning to FIG. 10, a restoration flow chart 1000 is illustrated showing the states used during the on-demand restoration process. These states include offline, preparing, restoring, and online.

At action 1002, the restoration begins in response to a user selecting a snapshot to restore, as described above with respect to FIG. 8.

At action 1004, a snapshot restore command internally creates a partially restored volume. This is the 'preparing' state and the volume is 'offline'.

At action 1006, the snapshot metadata is copied from the object store 116. At this point the restoration state is set to 'restoring' allowing a user to mount the partially restored volume. During this time, the storage OS 112 is actively pulling data from the object store 116 and performance of the volume 114 is lower than a fully restored volume.

At action 1008, the data is continuing to be pulled from the object store 116 to be stored in the volume 114. As the data available in the volume 114 increases, the performance of volume 114 gets better.

At action 1010, all of the snapshot data is present in the volume 114. The volume 114 is converted from a partially restored volume to a fully restored volume. There are no performance restrictions. The snapshot is unlocked and can be deleted.

Figure 11:
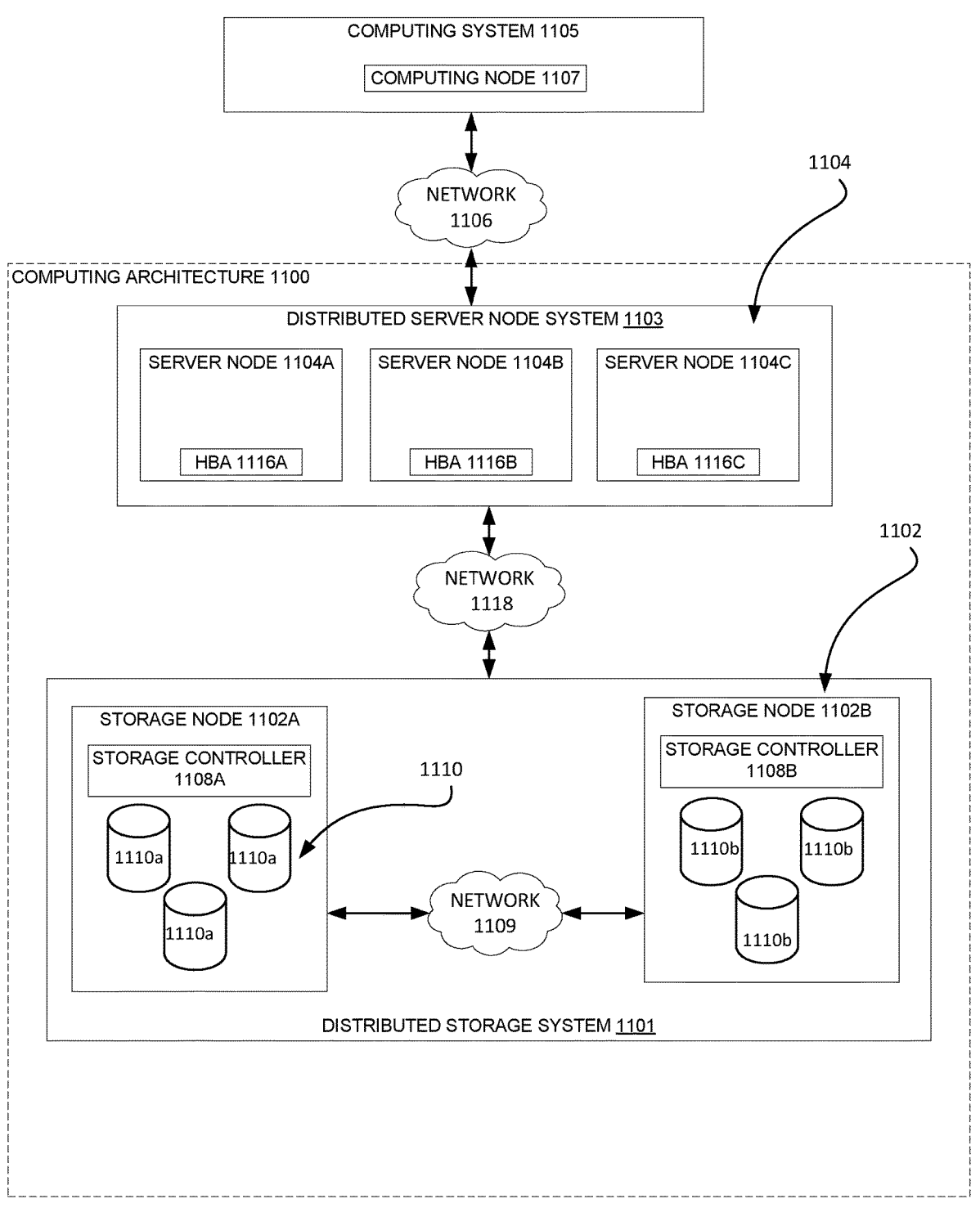
FIG. 11 is an illustration of an exemplary computing architecture according to some embodiments of the present description.

FIG. 11 is an illustration of a computing architecture 1100 in accordance with one or more example embodiments. The computing architecture 1100 is an example of one manner in which one or more of the computing architectures described herein may be implemented. The computing architecture 1100, which, in some cases includes a distributed storage system 1101 comprising a number of storage nodes 1102 (e.g., storage node 1102a, storage node 1102b) in communication with a distributed server node system 1103 comprising a number of server nodes 1104 (e.g., server node 1104a, server node 1104b, server node 1104c). The distributed storage system 1101 and the distributed server node system 1103 are examples in which containers and controllers of the above figures may be implemented, for example.

A computing system 1105 communicates with the computing architecture 1100, and in particular, the distributed server node system 1103, via a network 1106. The network 1106 may include any number of wired communications links, wireless communications links, optical communications links, or combination thereof. In one or more examples, the network 1106 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 1105 may include, for example, at least one computing node 1107. The computing node 1107 may be implemented using hardware, software, firmware, or a combination thereof. In one or more other examples, the computing node 1107 is a client (or client service) and the computing system 1105 that the client runs on is, for example, a physical server, a workstation, etc.

The storage nodes 1102 may be coupled via a network 1109, which may include any number of wired communications links, wireless communications links, optical communications links, or a combination thereof. For example, the network 1109 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 1109 may use a transmission control protocol/Internet protocol (TCP/IP), a remote direct memory access (RDMA) protocol (e.g., Infiniband®), RDMA over Converged Ethernet (RoCE) protocol (e.g., RoCEv1, RoCEv2, iWARP), and/or another type of protocol. Network 1109 may be local or remote with respect to a rack or datacenter. Additionally, or in the alternative, the network 1109 may extend between sites in a WAN configuration or be a virtual network extending throughout a cloud. Thus, the storage nodes 1102 may be as physically close or widely dispersed as needed depending on the application of use. In some examples, the storage nodes 1102 are housed in the same racks. In other examples, the storage nodes 1102 are located in different facilities at different sites around the world. The distribution and arrangement of the storage nodes 1102 may be determined based on cost, fault tolerance, network infrastructure, geography of the server nodes 1104, another consideration, or a combination thereof.

The distributed storage system 1101 processes data transactions on behalf of other computing systems such as, for example, the one or more server nodes 1104. The distributed storage system 1101 may receive data transactions from one or more of the server nodes 1104 and take an action such as reading, writing, or otherwise accessing the requested data. These data transactions may include server node read requests to read data from the distributed storage system 1101 and/or server node write requests to write data to the distributed storage system 1101. For example, in response to a request from one of the server nodes 1104a, 1104b, or 1104c, one or more of the storage nodes 1102 of the distributed storage system 1101 may return requested data, a status indictor, some other type of requested information, or a combination thereof, to the requesting server node. While two storage nodes 1102a and 1102b and three server nodes 1104a, 1104b, and 1104c are shown in FIG. 11, it is understood that any number of server nodes 1104 may be in communication with any number of storage nodes 1102. A request received from a server node, such as one of the server nodes 1104a, 1104b, or 1104c may originate from, for example, the computing node 1107 (e.g., a client service implemented within the computing node 1107) or may be generated in response to a request received from the computing node 1107 (e.g., a client service implemented within the computing node 1107).

While each of the server nodes 1104 and each of the storage nodes 1102 is referred to as a singular entity, a server node (e.g., server node 1104a, server node 1104b, or server node 1104c) or a storage node (e.g., storage node 1102a, or storage node 1102b) may be implemented on any number of computing devices ranging from a single computing system to a cluster of computing systems in communication with each other. In one or more examples, one or more of the server nodes 1104 may be run on a single computing system, which includes at least one processor such as a microcontroller or a central processing unit (CPU) operable to perform various computing instructions that are stored in at least one memory. In one or more examples, at least one of the server nodes 1104 and at least one of the storage nodes 1102 reads and executes computer readable code to perform the methods described further herein to orchestrate parallel file systems. The instructions may, when executed by one or more processors, cause the one or more processors to perform various operations described herein in connection with examples of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 1102 contains any number of storage devices 1110 for storing data and can respond to data transactions by the one or more server nodes 1104 so that the storage devices 1110 appear to be directly connected (i.e., local) to the server nodes 1104. For example, the storage node 1102a may include one or more storage devices 1110a and the storage node 1102b may include one or more storage devices 1110b. In various examples, the storage devices 1110 include HDDs, SSDs, and/or any other suitable volatile or non-volatile data storage medium. In some examples, the storage devices 1110 are relatively homogeneous (e.g., having the same manufacturer, model, configuration, or a combination thereof). However, in other example, one or both of the storage node 1102*a* and the storage node 1102*b* may alternatively include a heterogeneous set of storage devices 1110*a* or a heterogeneous set of storage device 1110*b*, respectively, that includes storage devices of different media types from different manufacturers with notably different performance.

The storage devices 1110 in each of the storage nodes 1102 are in communication with one or more storage controllers 1108. In one or more examples, the storage devices 1110*a* of the storage node 1102*a* are in communication with the storage controller 1108*a*, while the storage devices 1110*b* of the storage node 1102*b* are in communication with the storage controller 1108*b*. While a single storage controller (e.g., 1108*a*, 1108*b*) is shown inside each of the storage node 1102*a* and 1102*b*, respectively, it is understood that one or more storage controllers may be present within each of the storage nodes 1102*a* and 1102*b*.

The storage controllers 1108 exercise low-level control over the storage devices 1110 in order to perform data transactions on behalf of the server nodes 1104, and in so doing, may group the storage devices 1110 for speed and/or redundancy using a protocol such as RAID (Redundant Array of Independent/Inexpensive Disks). The grouping protocol may also provide virtualization of the grouped storage devices 1110. At a high level, virtualization includes mapping physical addresses of the storage devices 1110 into a virtual address space and presenting the virtual address space to the server nodes 1104, other storage nodes 1102, and other requestors. Accordingly, each of the storage nodes 1102 may represent a group of storage devices as a volume. A requestor can therefore access data within a volume without concern for how it is distributed among the underlying storage devices 1110.

The distributed storage system 1101 may group the storage devices 1110 for speed and/or redundancy using a virtualization technique such as RAID or disk pooling (that may utilize a RAID level). The storage controllers 1108*a* and 1108*b* are illustrative only; more or fewer may be used in various examples. In some cases, the distributed storage system 1101 may also be communicatively coupled to a user display for displaying diagnostic information, application output, and/or other suitable data.

With respect to the distributed server node system 1103, each of the one or more server nodes 1104 includes any computing resource that is operable to communicate with the distributed storage system 1101, such as by providing server node read requests and server node write requests to the distributed storage system 1101. In one or more examples, each of the server nodes 1104 is a physical server. In one or more examples, each of the server nodes 1104 includes one or more host bus adapters (HBA) 1116 in communication with the distributed storage system 1101. The HBA 1116 may provide, for example, an interface for communicating with the storage controllers 1108 of the distributed storage system 1101, and in that regard, may conform to any suitable hardware and/or software protocol. In various examples, the HBAs 1116 include Serial Attached SCSI (SAS), ISCSI, InfiniBand®, Fibre Channel, and/or Fibre Channel over Ethernet (FCOE) bus adapters. Other suitable protocols include SATA, eSATA, PATA, USB, and Fire Wire.

The HBAs 1116 of the server nodes 1104 may be coupled to the distributed storage system 1101 by a network 1118 comprising any number of wired communications links, wireless communications links, optical communications links, or combination thereof. For example, the network 1118 may include a direct connection (e.g., a single wire or other point-to-point connection), a networked connection, or any combination thereof. Examples of suitable network architectures for the network 1118 include a LAN, an Ethernet subnet, a PCI or PCIe subnet, a switched PCIe subnet, a WAN, a MAN, the Internet, Fibre Channel, or the like. In many examples, a server node 1104 may have multiple communications links with a single distributed storage system 1101 for redundancy. The multiple links may be provided by a single HBA 1116 or multiple HBAs 1116 within the server nodes 1104. In some examples, the multiple links operate in parallel to increase bandwidth.

In one or more examples, each of the server nodes 1104 may have another HBA that is used for communication with the computing system 1105 over the network 1106. In other examples, each of the server nodes 1104 may have some other type of adapter or interface for communication with the computing system 1105 over the network 1106.

To interact with (e.g., write, read, modify, etc.) remote data, a HBA 1116 sends one or more data transactions to the distributed storage system 1101. Data transactions are requests to write, read, or otherwise access data stored within a volume in the distributed storage system 1101, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 1101 executes the data transactions on behalf of the server nodes 1104 by writing, reading, or otherwise accessing data on the relevant storage devices 1110. A distributed storage system 1101 may also execute data transactions based on applications running on the distributed server node system 1103. For some data transactions, the distributed storage system 1101 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 1101 to the distributed server node system 1103, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

creating, by an orchestrator of a container system, a volume snapshot object, the volume snapshot object including an identifier unique to an individual volume snapshot for a selected volume in the container system, wherein the volume snapshot object is created before the individual volume snapshot is created;

creating, by a container of the container system, the individual volume snapshot for the selected volume in response to detecting the creation of the volume snapshot object;

determining, by the container of the container system, a relationship between the selected volume in the container and an object store remote from the container;

transferring, by the container of the container system, the created individual volume snapshot of the selected volume into the object store based on the relationship; and updating, by the container of the container system, a status of the volume snapshot object when the created individual volume snapshot is stored into the object store.

2. The method of claim 1, wherein the volume snapshot object is created outside of the container, and the individual volume snapshot is created inside the container.

3. The method of claim 1, further comprising:

stamping, by a container monitoring module (CMM) of the container, the identifier unique to the individual volume snapshot onto the individual volume snapshot.

4. The method of claim 1, wherein the creating of the individual volume snapshot includes:

sending, by a container monitoring module (CMM) of the container, a payload that includes the identifier unique to the individual volume snapshot to a storage OS of the container;

creating, by the storage OS, one or more configurations for the object store based on the payload; and creating, by the storage OS, one or more relationships between the selected volume and the object store.

5. The method of claim 4, further comprising:

sending, by the storage OS, a response message to the CMM indicating a failure occurred, the failure comprising at least one of a failure to create the one or more configurations, a failure to create the one or more relationships, or a failure to store the created individual volume snapshot; and resending, by the CMM, the payload to the storage OS upon receiving the response message indicating the failure occurred.

6. The method of claim 1, further comprising:

sending, by a storage OS of the container, a response message to a container monitoring module (CMM) indicating a success of initiating the storing of the created individual volume snapshot into the object store; and continuously updating, by the CMM, the status of the volume snapshot object with an indication of whether the storing is in progress or complete.

7. The method of claim 1, further comprising:

updating, by the container of the container system, the volume snapshot object such that the volume snapshot object further includes at least one an object store identifier to identify the object store for storing the created individual volume snapshot, a logical space required to restore a snapshot, a storing percent complete, or a snapshot create time.

8. A non-transitory machine readable medium having stored thereon instructions for performing a method of volume snapshot creation in a container system, comprising machine executable code which when executed by at least one machine, causes the machine to:

create a volume snapshot object including an identifier unique to an individual volume snapshot for a selected volume in the container system, wherein the volume snapshot object is created before the individual volume snapshot is created;

create the individual volume snapshot in a container of the container system for the selected volume in response to detecting the creation of the volume snapshot object;

determine a relationship between the selected volume in the container and an object store remote from the container;

transfer the created individual volume snapshot of the selected volume into the object store based on the relationship;

update a status of the volume snapshot object when the transfer of the created individual volume snapshot is in progress; and update the status of the volume snapshot object when the transfer of the created individual volume snapshot is complete.

9. The non-transitory machine readable medium of claim 8, further comprising machine executable code that causes the machine to:

receive a user selection to create the individual volume snapshot for the selected volume in the container system.

10. The non-transitory machine readable medium of claim 8, further comprising machine executable code that causes the machine to:

stamp the identifier unique to the individual volume snapshot onto the individual volume snapshot.

11. The non-transitory machine readable medium of claim 8, further comprising machine executable code that causes the machine to:

send a payload that includes the identifier unique to the individual volume snapshot to a storage operating system (OS) in the container system;

create one or more configurations for the object store based on the payload; and create one or more relationships between the selected volume and the object store.

12. The non-transitory machine readable medium of claim 11, further comprising machine executable code that causes the machine to:

send a response message indicating a failure occurred, the failure includes a failure to create the one or more configurations, a failure to create the one or more relationships, or a failure to store the created individual volume snapshot; and resend the payload to the storage OS upon receiving the response message indicating the failure occurred.

13. The non-transitory machine readable medium of claim 8, further comprising machine executable code that causes the machine to:

send a response message indicating a success of initiating the transfer of the created individual volume snapshot into the object store; and continuously update the status of the volume snapshot object during the transfer of the created individual volume snapshot.

14. The non-transitory machine readable medium of claim 8, further comprising machine executable code that causes the machine to:

update the volume snapshot object such that the volume snapshot object further includes at least one of an object store identifier to identify the object store for storing the created individual volume snapshot, a logical space required to restore a snapshot, a transfer percent complete, or a snapshot create time.

15. A computing device comprising:

a memory containing machine readable medium comprising machine executable code having stored thereon instructions for performing a method of volume snapshot creation in a container system; and a processor coupled to the memory, the processor configured to execute the machine executable code to cause the processor to:

receive a user request to create an individual volume snapshot for a selected volume in the container system;

create a volume snapshot object in response to the user request, the volume snapshot object having an identifier unique to the individual volume snapshot, wherein the volume snapshot object is created before the individual volume snapshot is created;

create the individual volume snapshot in a container of the container system for the selected volume in response to detecting the creation of the volume snapshot object;

determine a relationship between the selected volume in the container and an object store remote from the container;

transfer the created individual volume snapshot of the selected volume into the object store based on the relationship; and update the volume snapshot object such that the volume snapshot object further includes at least one of an object store identifier to identify the object store for storing the created individual volume snapshot, a logical space required to restore a snapshot, a transfer percent complete, or a snapshot create time.

16. The computing device of claim 15, wherein the processor is further configured to:

update a status of the volume snapshot object when the transfer of the created individual volume snapshot is in progress; and update the status of the volume snapshot object when the transfer of the created individual volume snapshot is complete.

17. The computing device of claim 15, wherein the processor is further configured to:

stamp the identifier unique to the individual volume snapshot onto the individual volume snapshot.

18. The computing device of claim 15, wherein the processor is further configured to:

send a payload that includes the identifier unique to the individual volume snapshot to a storage operating system (OS) in the container system;

create one or more configurations for the object store based on the payload; and create one or more relationships between the selected volume and the object store.

19. The computing device of claim 18, wherein the processor is further configured to:

send a response message indicating a failure occurred, the failure includes a failure to create the one or more configurations, a failure to create the one or more relationships, or a failure to store the created individual volume snapshot; and resend the payload to the storage OS upon receiving the response message indicating the failure occurred.

20. The computing device of claim 15, wherein the processor is further configured to:

send a response message indicating a success of initiating the transfer of the created individual volume snapshot into the object store; and continuously update a status of the volume snapshot object with an indication of whether the transfer is in progress or complete.

\* \* \* \* \*